United States Patent
Das Sharma et al.

(10) Patent No.: US 12,332,826 B2
(45) Date of Patent: Jun. 17, 2025

(54) DIE-TO-DIE INTERCONNECT

(71) Applicant: Intel Corporation, Santa Clara, CA (US)

(72) Inventors: Debendra Das Sharma, Saratoga, CA (US); Swadesh Choudhary, Mountain View, CA (US); Narasimha Lanka, Dublin, CA (US); Lakshmipriya Seshan, Sunnyvale, CA (US); Gerald Pasdast, San Jose, CA (US); Zuoguo Wu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 355 days.

(21) Appl. No.: 17/852,865

(22) Filed: Jun. 29, 2022

(65) Prior Publication Data

US 2022/0342840 A1     Oct. 27, 2022

Related U.S. Application Data

(60) Provisional application No. 63/295,218, filed on Dec. 30, 2021.

(51) Int. Cl.
    *G06F 13/42* (2006.01)
(52) U.S. Cl.
    CPC .. *G06F 13/4221* (2013.01); *G06F 2213/0026* (2013.01)
(58) Field of Classification Search
    CPC ............... G06F 13/4221; G06F 2213/0026
    See application file for complete search history.

(56) References Cited

U.S. PATENT DOCUMENTS

| | | | |
|---|---|---|---|
| 11,907,035 B2 * | 2/2024 | Li | G06F 13/4295 |
| 2011/0164692 A1 | 7/2011 | Kwon et al. | |
| 2017/0004098 A1 | 1/2017 | Sharma et al. | |
| 2017/0109315 A1 | 4/2017 | Safranek et al. | |
| 2019/0065426 A1 | 2/2019 | Sharma et al. | |
| 2019/0220436 A1 | 7/2019 | Pitigoi-Aron et al. | |
| 2020/0278733 A1 * | 9/2020 | Li | G06F 1/28 |
| 2020/0327084 A1 | 10/2020 | Choudhary et al. | |
| 2020/0327088 A1 | 10/2020 | Choudhary et al. | |
| 2020/0356436 A1 | 11/2020 | Iyer et al. | |
| 2020/0394150 A1 * | 12/2020 | Lanka | G06F 13/4226 |
| 2022/0012140 A1 | 1/2022 | Sharma et al. | |
| 2022/0334995 A1 * | 10/2022 | Das Sharma | G06F 13/4221 |
| 2022/0342840 A1 | 10/2022 | Sharma et al. | |
| 2022/0342841 A1 * | 10/2022 | Choudhary | G06F 13/4221 |

OTHER PUBLICATIONS

PCT International Search Report and Written Opinion issued in PCT/US2022/079968, dated Mar. 14, 2023; 19 pages.

* cited by examiner

*Primary Examiner* — Henry Tsai
*Assistant Examiner* — Christopher A Daley
(74) *Attorney, Agent, or Firm* — Alliance IP, LLC

(57) ABSTRACT

A port is to couple to another die over a die-to-die (D2D) link and includes physical layer (PHY) circuitry including a first number of sideband lanes to carry data for use in training and management of the D2D link, and a second number of mainband lanes to implement a main data path of the D2D link. The mainband lanes include a forwarded clock lane, a valid lane, and a plurality of data lanes. A logical PHY coordinates functions of the sideband lanes and the mainband lanes.

20 Claims, 17 Drawing Sheets

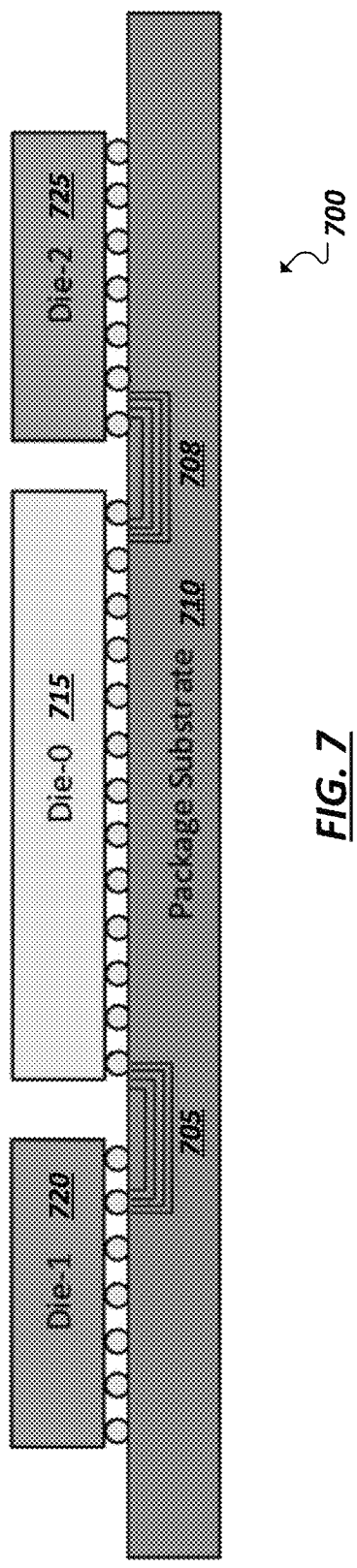
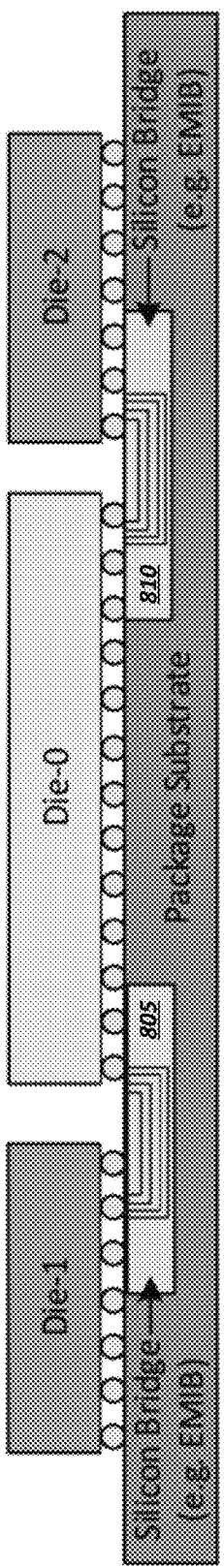
FIG. 7
FIG. 8A

DIE-TO-DIE INTERCONNECT

RELATED APPLICATIONS

This application claims benefit to U.S. Provisional Patent Application Ser. No. 63/295,218, filed Dec. 30, 2021, which is incorporated by reference herein in its entirety.

FIELD

This disclosure pertains to computing systems, and in particular (but not exclusively) to physical interconnects and related link protocols.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 7 illustrates simplified block diagram of a two-dimensional package substrate and interconnect coupling two or more device.

FIGS. 8A-8D illustrates simplified block diagram of example package configurations.

DETAILED DESCRIPTION

Figure 1:
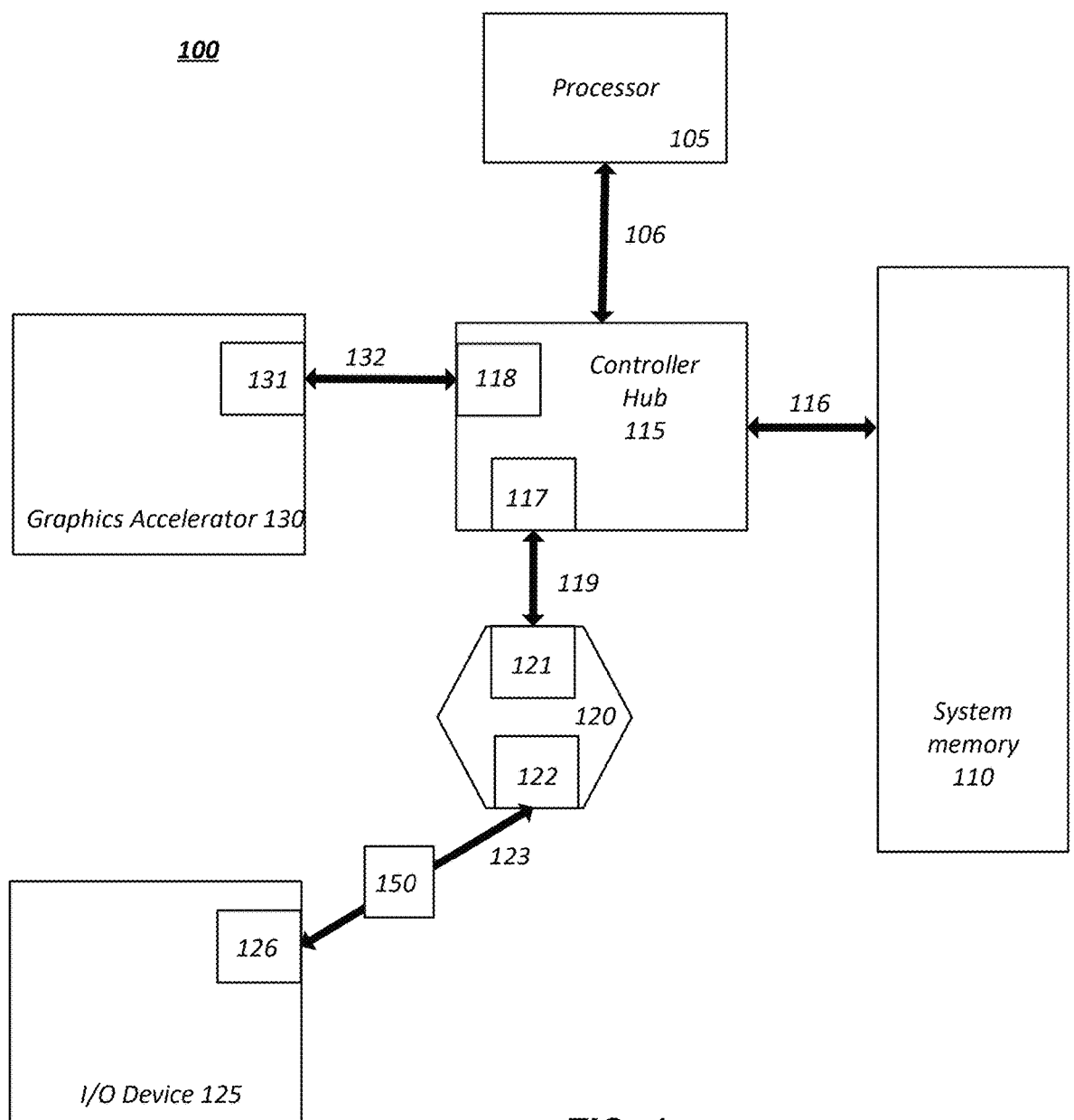
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the solutions provided in the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. The techniques and teachings of embodiments described herein may also be applied at the server level, including rack scale server platforms, blade server platforms, and other server architectures. Moreover, the apparatus', methods, and systems described herein are not limited to physical computing devices, but may also relate to software emulations and simulations of physical systems, such as those architectures discussed in the examples below. As will become readily apparent in the description below, the embodiments of methods, apparatus', and systems described herein (whether in reference to hardware, firmware, software, or a combination thereof) are important in enabling computing platforms to handle increasing data speeds while balancing power usage and physical footprint, among other example considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the solutions described herein.

Modern interconnect fabric architectures enable components and devices from different vendors to inter-operate in an open architecture, spanning multiple market segments; Clients (Desktops and Mobile), Servers (Standard and Enterprise), and Embedded and Communication devices. For instance, high performance, general purpose I/O interconnect protocols (e.g., Peripheral Component Interconnect Express (PCIe)) have been defined for a wide variety of future computing and communication platforms. Such protocols and corresponding architectures may take advantage of advances in point-to-point interconnects, switch-based technology, and packetized protocol to deliver new levels of performance and features. As an example, Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. Interconnect protocols and features discussed below may be utilized to implement the fabric and links coupling the set of components introduced here in FIG. 1.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 may be implemented as a root hub, root complex, or root controller in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
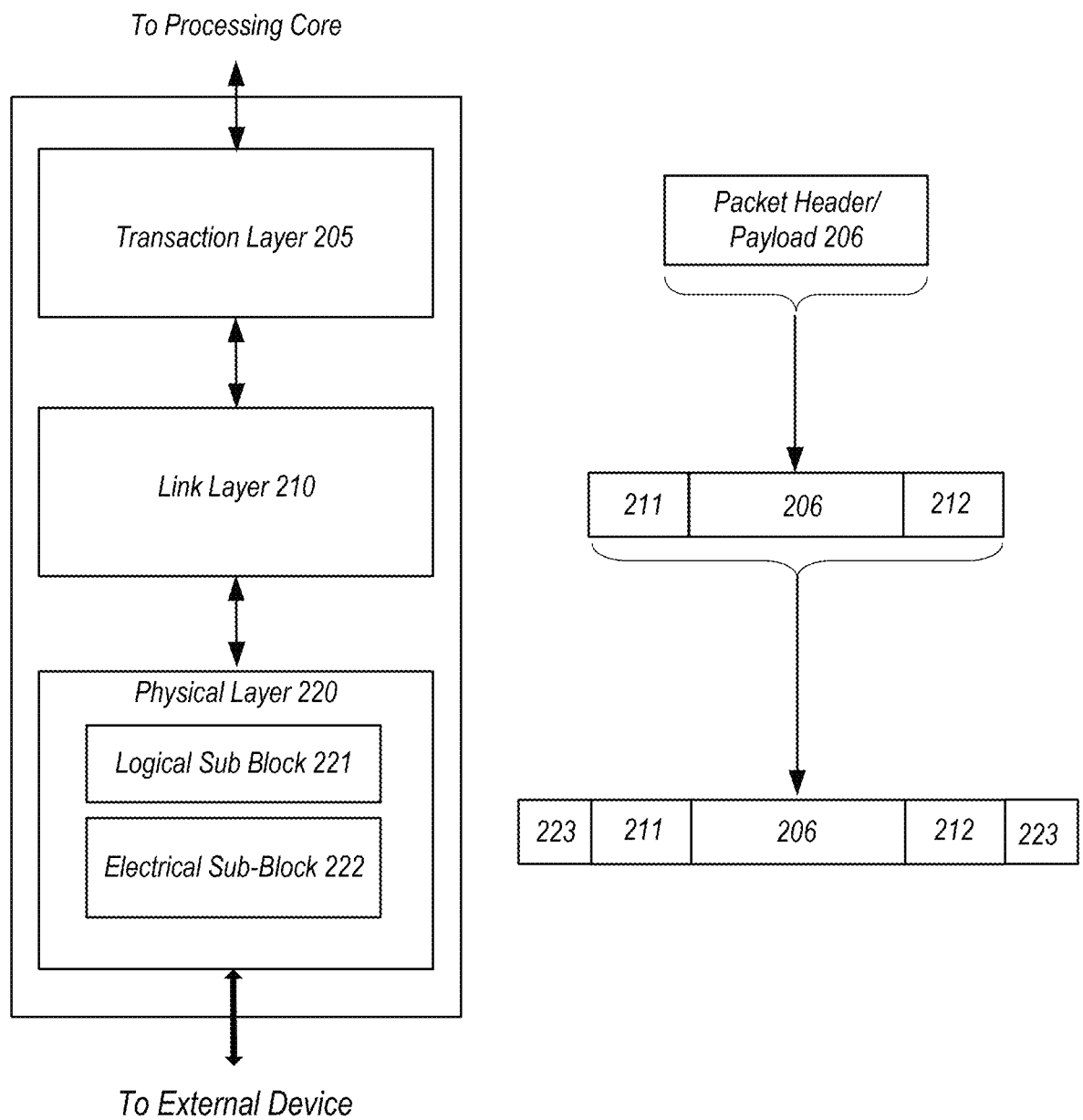
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a Compute Express Link (CXL) stack, or other high performance computing interconnect stack, or other layered stack. Although the discussion immediately below in reference to FIGS. 1-4 are in relation to a general purpose interconnect protocol stack (e.g., PCIe), the same concepts may be applied to other interconnect stacks. In one embodiment, protocol stack 200 is a protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

A protocol may use packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. For instance, a protocol may implement split transactions, i.e. transactions with request and response separated by time, allowing a link to carry other traffic while the target device gathers data for the response. In some implementations, flow control may be implemented using a credit-based flow control scheme. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the devices supporting the protocol. Transactions to the configuration space include read requests and write requests. Message space transactions (or, simply messages) are defined to support in-band communication between protocol agents implementing the protocols on the devices. Therefore, in one embodiment, transaction layer 205 assembles packet header/payload 206.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to physical transmission medium connecting the transmitter to another external device. The receiver is supplied with serialized symbols from an external device and transforms the received signals into a bit-stream. The bit-stream is de-serialized and supplied to logical sub-block 221. In one embodiment, an $8b/10b$ transmission code is employed, where ten-bit symbols are transmitted/received. In other instances, a $128b/130b$ encoding may be employed, while in still other implementations, flit-based transmission may be utilized, among other examples. In one example, special symbols are used to frame a packet with frames 223. In addition, in one example, the receiver also provides a symbol clock recovered from the incoming serial stream.

A transmission medium may implement a transmission path for transmitting data, such as a transmission line, a copper line, an optical line, a wireless communication channel, an infrared communication link, or other communication path. A connection between two devices, is referred to as a link. A link may be implemented using one or multiple constituent transmission paths, or lanes. To scale bandwidth, a link may aggregate multiple lanes denoted by xN, where N is any supported Link width, such as 1, 2, 4, 8, 12, 16, 32, 64, or wider. In some implementations, differential signaling may be employed, with a differential pair referring to two transmission paths to transmit differential signals. As an example, in a differential pair, when a first line in the pair toggles from a low voltage level to a high voltage level, i.e. a rising edge, the other line in the pair drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

As stated above, although transaction layer 205, link layer 210, and physical layer 220 are discussed in reference to a specific embodiment (e.g., a traditional PCIe protocol stack), a layered protocol stack is not so limited. In fact, any layered protocol may be included/implemented. As an example, an port/interface may include logic implemented in hardware circuitry and/or firmware to implement various layers in a layered protocol, such as: (1) a first layer to assemble packets (e.g., a transaction or protocol layer); a second layer to sequence packets (e.g., a link or data link layer); and a third layer to transmit the packets (e.g., a physical layer), including layers of protocols discussed more particularly below.

In some implementations, interconnect protocols may implement cache-coherent links. As one example, Ultra Path Interconnect™ (UPI™) may be utilized in high performance computing platforms, such as workstations or servers, including in systems where PCIe or another interconnect protocol is typically used to connect processors, accelerators, I/O devices, and the like. However, UPI is not so limited. Instead, UPI may be utilized in any of the systems or platforms described herein. Furthermore, the individual ideas developed may be applied to other interconnects and platforms, such as PCIe, MIPI, QPI, etc.

Figure 3:
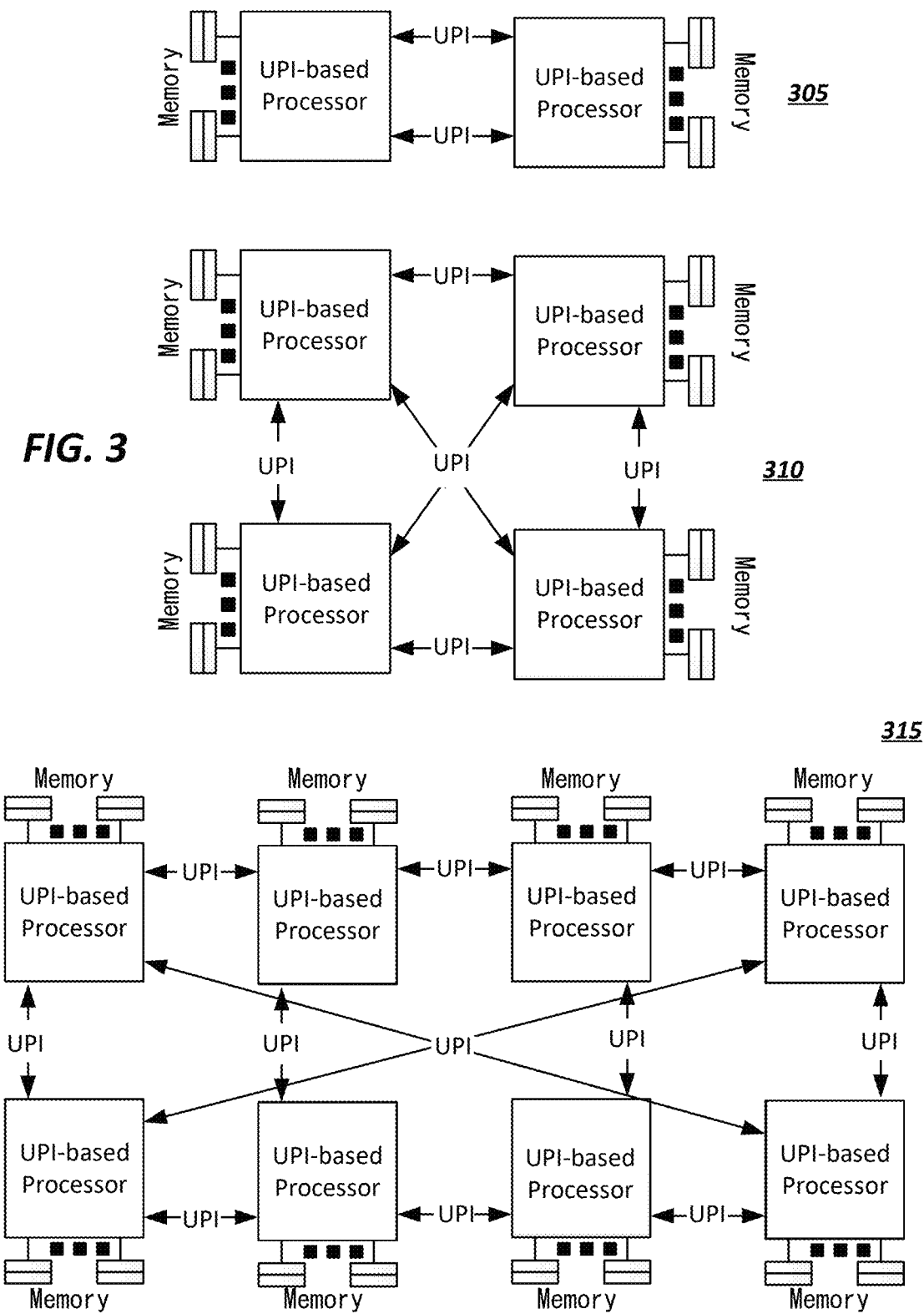
FIG. 3 illustrates embodiments of potential high performance, processor-to-processor interconnect configurations.

To support multiple devices, in one example implementation, UPI can be Instruction Set Architecture (ISA) agnostic (i.e. UPI is able to be implemented in multiple different devices). In another scenario, UPI may also be utilized to connect high performance I/O devices, not just processors or accelerators. For example, a high performance PCIe device may be coupled to UPI through an appropriate translation bridge (i.e. UPI to PCIe). Moreover, the UPI links may be utilized by many UPI based devices, such as processors, in various ways (e.g. stars, rings, meshes, etc.). Indeed, interconnect protocols, such as UPI and others discussed herein, may be used to facilitate interconnections between dies or packages. For instance, FIG. 3 illustrates example implementations of various potential multi-socket configurations. A two-socket configuration 305, as depicted, can include two links; however, in other implementations, one link may be utilized. For larger topologies, any configuration may be utilized as long as an identifier (ID) is assignable and there is some form of virtual path, among other additional or substitute features. As shown, in one example, a four socket configuration 310 has a link from each processor to another. But in the eight socket implementation shown in configuration 315, not every socket is directly connected to each other through a respective link. However, if a virtual path or channel exists between the processors, the configuration is supported. A range of supported processors includes 2-32 in a native domain. Higher numbers of processors may be reached through use of multiple domains or other interconnects between node controllers, among other examples.

As with other interconnect architectures, the UPI architecture includes a definition of a layered protocol architecture, including in some examples, protocol layers (coherent, non-coherent, and, optionally, other memory based protocols), a routing layer, a link layer, and a physical layer. In some implementations, respective layers in the protocol stack may construct and/or deal with their own level of granularity or quantum of information (e.g., the protocol layer with packets, the link layer with flits, the physical layer with phits or symbols, among other examples) Note that a packet, in some embodiments, may include partial flits, a single flit, or multiple flits based on the implementation.

In another example interconnect protocol, a Compute Express Link (CXL) interconnect protocol may be utilized to provide an improved, high-speed CPU-to-device and CPU-to-memory interconnect designed to accelerate next-generation data center performance, among other application. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 4:
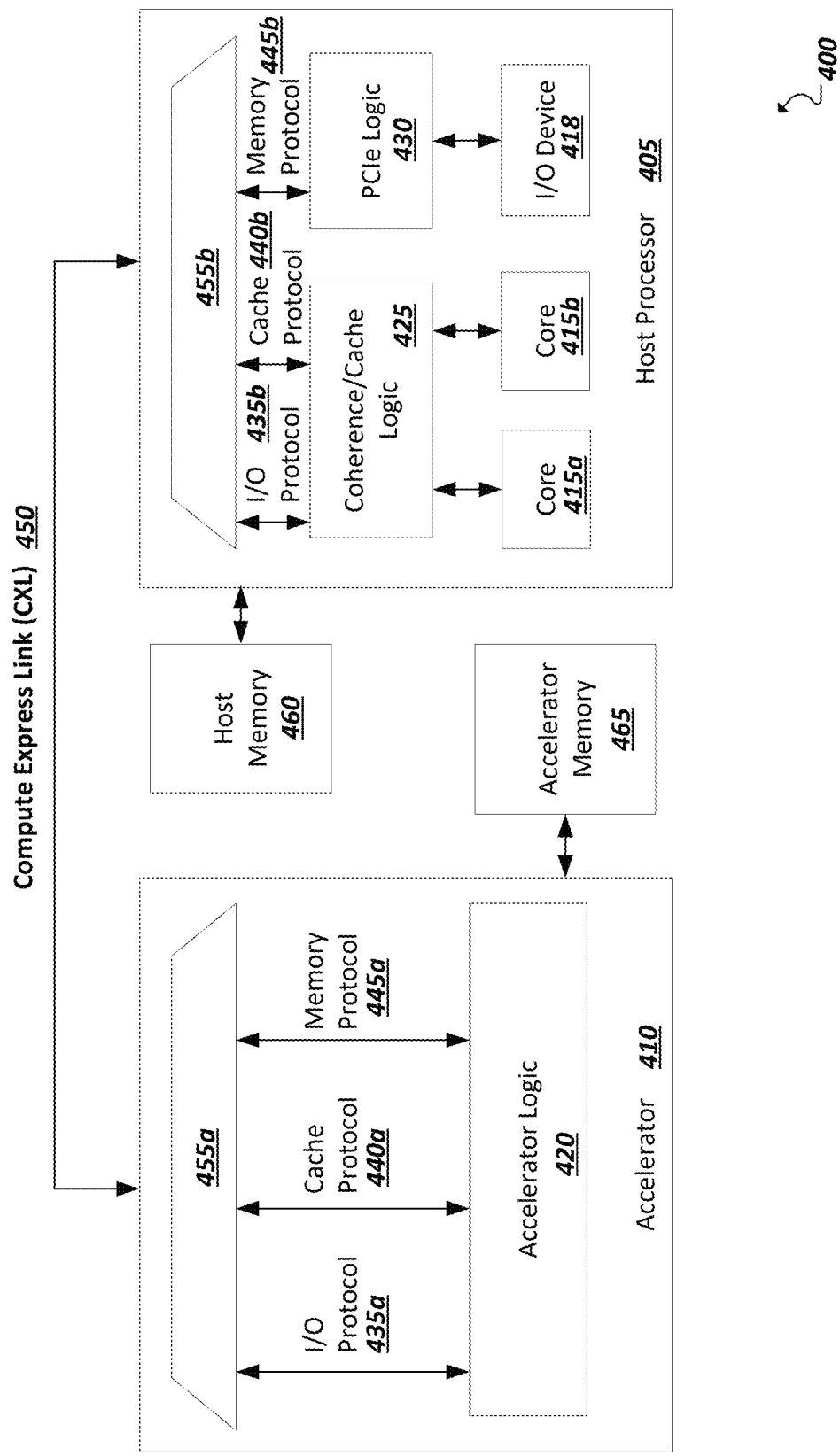
FIG. 4 illustrates an embodiment of a layered protocol stack associated with an interconnect.

Turning to FIG. 4, a simplified block diagram 400 is shown illustrating an example system utilizing a CXL link 450. For instance, the link 450 may interconnect a host processor 405 (e.g., CPU) to an accelerator device 410. In this example, the host processor 405 includes one or more processor cores (e.g., 415a-b) and one or more I/O devices (e.g., 418). Host memory (e.g., 460) may be provided with the host processor (e.g., on the same package or die). The accelerator device 410 may include accelerator logic 420 and, in some implementations, may include its own memory (e.g., accelerator memory 465). In this example, the host processor 405 may include circuitry to implement coherence/cache logic 425 and interconnect logic (e.g., PCIe logic 430). CXL multiplexing logic (e.g., 455a-b) may also be provided to enable multiplexing of CXL protocols (e.g., I/O protocol 435a-b (e.g., CXL.io), caching protocol 440a-b (e.g., CXL.cache), and memory access protocol 445a-b (CXL.mem)), thereby enabling data of any one of the supported protocols (e.g., 435a-b, 440a-b, 445a-b) to be sent, in a multiplexed manner, over the link 450 between host processor 405 and accelerator device 410.

In some implementations of CXL, a Flex Bus port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 5:
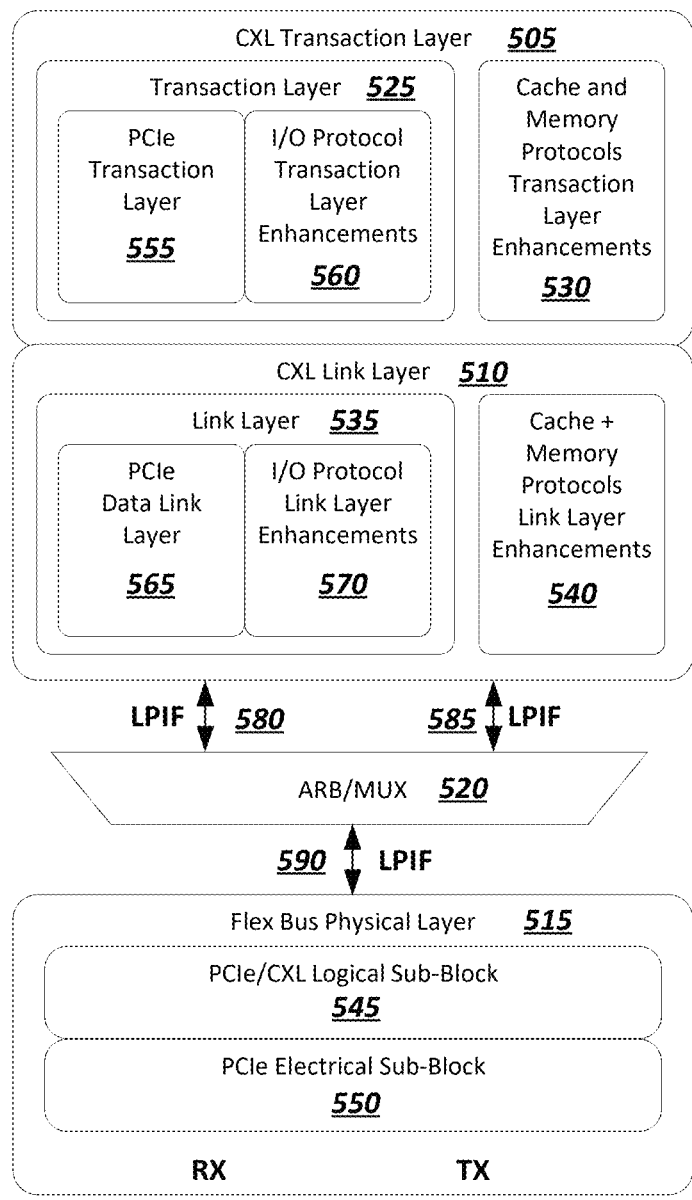
FIG. 5 illustrates a simplified block diagram of an example computing system utilizing a link compliant with a Compute Express Link (CXL)-based protocol.

FIG. 5 is a simplified block diagram illustrating an example port architecture 500 (e.g., Flex Bus) utilized to implement CXL links. For instance, Flex Bus architecture may be organized as multiple layers to implement the multiple protocols supported by the port. For instance, the port may include transaction layer logic (e.g., 505), link layer logic (e.g., 510), and physical layer logic (e.g., 515) (e.g., implemented all or in-part in circuitry). For instance, a transaction (or protocol) layer (e.g., 505) may be subdivided into transaction layer logic 525 that implements a PCIe transaction layer 555 and CXL transaction layer enhancements 560 (for CXL.io) of a base PCIe transaction layer 555, and logic 530 to implement cache (e.g., CXL.cache) and memory (e.g., CXL.mem) protocols for a CXL link. Similarly, link layer logic 535 may be provided to implement a base PCIe data link layer 565 and a CXL link layer (for CX1.io) representing an enhanced version of the PCIe data link layer 565. A CXL link layer 510 may also include cache and memory link layer enhancement logic 540 (e.g., for CXL.cache and CXL.mem).

Continuing with the example of FIG. 5, a CXL link layer logic 510 may interface with CXL arbitration/multiplexing (ARB/MUX) logic 520, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 515 based on a PCIe physical layer (e.g., PCIe electrical PHY 550). For instance, a Flex Bus physical layer may be implemented as a converged logical physical layer 545 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., ×16, ×8, ×4, ×2, ×1, etc.). In PCIe mode, links implemented by the port 500 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

In some implementations, an interface may be provided to couple circuitry or other logic (e.g., an intellectual property (IP) block or other hardware element) implementing a link layer (e.g., 510) to circuitry or other logic (e.g., an IP block or other hardware element) implementing at least a portion of a physical layer (e.g., 515) of a protocol. For instance, an interface based on a Logical PHY Interface (LPIF) specification to define a common interface between a link layer controller, module, or other logic and a module implementing a logical physical layer ("logical PHY" or "log PHY") to facilitate interoperability, design and validation re-use between one or more link layers and a physical layer for an interface to a physical interconnect, such as in the example of FIG. 5. Additionally, as in the example of FIG. 5, an interface may be implemented with logic (e.g., 535, 540) to simultaneously implement and support multiple protocols. Further, in such implementations, an arbitration and multiplexer layer (e.g., 520) may be provided between the link layer (e.g., 510) and the physical layer (e.g., 515). In some implementations, each block (e.g., 515, 520, 535, 540) in the multiple protocol implementation may interface with the other block via an independent LPIF interface (e.g., 580, 585, 990). In cases where bifurcation is supported, each bifurcated port may likewise have its own independent LPIF interface, among other examples.

While examples discussed herein may reference the use of LPIF-based link layer-logical PHY interfaces, it should be appreciated that the details and principles discussed herein may be equally applied to non-LPIF interfaces. Likewise, while some examples may reference the use of common link layer-logical PHY interfaces to couple a PHY to controllers implement CXL or PCIe, other link layer protocols may also make use of such interfaces. Similarly, while some references may be made to Flex Bus physical layers, other physical layer logic may likewise be employed in some implementations and make use of common link layer-logical PHY interfaces, such as discussed herein, among other example variations that are within the scope of the present disclosure.

Traditional die-to-die interconnects are either vendor-specific or application specific (e.g., HBM Connect is used to connect memory on-package). Some die-to-die interconnects (e.g., MB from Intel, HBI and BoW from OCP consortium) only define a physical layer and do not provide a mechanism for ensuring interoperability across dies. Indeed, current solutions do not exist for implementing a general-purpose die-to-die interconnect that can be used for seamless interoperability between dies and can provide open innovation slots on the package, which engineers can innovate around. An improved interconnect architecture is introduced herein to implement a standardized die-to-die interface through the Universal Chiplet Interconnect Express (UCIe) protocol. Not only does UCIe enable a solution for general-purpose die-to-die interconnects for the on-package and off-package coupling of dies, but the standardization of the interface enable the interconnection of different devices from different vendors and different fabs across different technology nodes using different packaging choices to improve upon existing computing system and implement new systems.

UCIe offers high-bandwidth, low-latency, power-efficient, and cost-effective on-package connectivity between chiplets. It addresses the projected growing demands of compute, memory, storage, and connectivity across the entire compute continuum spanning cloud, edge, enterprise, 5G, automotive, high-performance computing, and hand-held segments. While Moore's Law has held true, allowing for increasingly compact and powerful computing blocks, the increasing on-package integration of multiple dies in mainstream commercial offerings such as client CPUs, server CPUs, GP-GPUs, etc. has resulted in larger die sizes to meet growing performance demands. This phenomenon, however, has resulted in designs running running up against the die reticle limit. Examples include multi-core CPUs with core count in the hundreds or very large fanout switches. Even when a die can fit within the reticle limit, multiple smaller dies connected in a package may be preferable for yield optimization as well as die reuse across multiple market segments. On-package connectivity of identical dies enables these scale-up applications. Additionally, chiplet integration on package also enables a designer to make different trade-offs for different market segments by choosing different numbers and types of dies. For example, one can choose different numbers of compute, memory, and I/O dies depending on the need of the segment. One does not need to do a different die design for different segments, resulting in lower product SKU cost.

On-package integration of chiplets enables a fast and cost-effective way to provide bespoke solutions. For example, different usages may need different acceleration capability but with the same cores, memory, and I/O. It also allows the co-packaging of dies where the optimal process node choice is made based on the functionality. For example, memory, logic, analog, and co-packaged optics each needs a different process technology which can be packaged with chiplets. Since package traces are short and offers dense routing, applications requiring high bandwidth such as memory access (e.g., High Bandwidth Memory), are implemented as on-package integration.

UCIe is an open, multi-protocol capable, on-package interconnect standard for connecting multiple dies on the same package. UCIe enables the development of a vibrant ecosystem supporting disaggregated die architectures which can be interconnected using UCIe. UCIe may support multiple underlying protocols provided by various protocol layer blocks which may be utilized in connection with UCIe, such as PCIe, CXL, Advanced Extensible Interface™ (AXI), UPI, and other others, as well as a raw mode that can be used to map any protocol of choice (as long as both link partners support it) on top of a common physical and link layer. UCIe may additionally encompass the elements for system on chip (SoC) construction, such as the application layer and the form-factors relevant to the package (e.g., bump location, power delivery, thermal solution, etc.), among other features. The features of UCIe act to ensure interoperability across a wide range of devices having different performance characteristics. A well-defined debug and compliance mechanism is provided to ensure interoperability. UCIe may additionally allow support of devices in a backward compatible manner.

While UCIe supports a wide range of usage models, a subset are provided here as illustrative examples. As noted above, some protocols may be mapped explicitly onto UCIe, such as PCIe and CXL. Such protocols may be mapped onto a UCIe flit format, including the raw mode. As an example, widely used protocols such as PCIe and CXL may be mapped onto UCIe to more on-package integration, for instance, by replacing the PCIe SERDES PHY and the PCIe/CXL Logical PHY along with the link level retry, improve power, and enhance performance, among other example features. UCIe raw mode is protocol-agnostic and enables other protocols to be mapped ad hoc by a device, while allowing usages such as integrating a stand-alone SERDES/transceiver tile (e.g., ethernet) on-package, among other example features.

Figure 6:
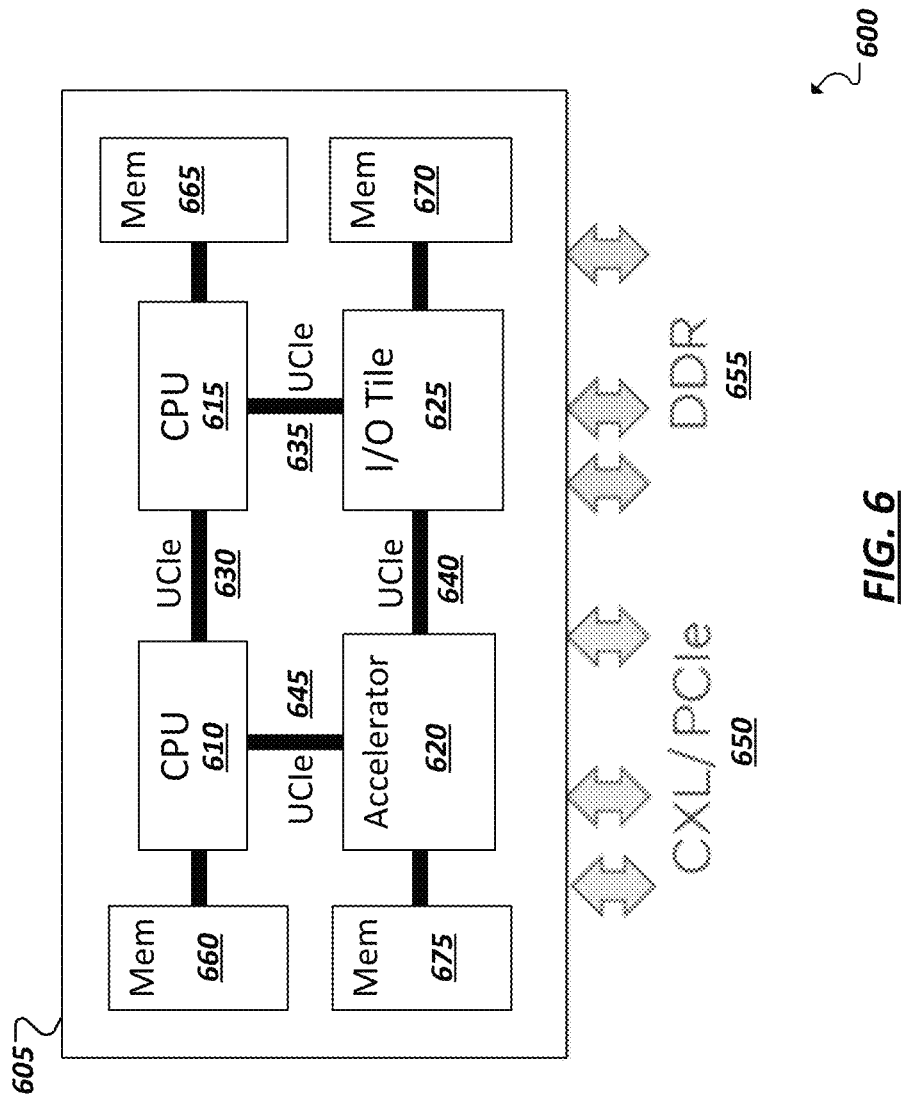
FIG. 6 illustrates a simplified block diagram of an example system on chip (SoC) package.

FIG. 6 is a simplified block diagram 600 illustrating an example implementation of an SoC package 605 including a number of processor dies (e.g., 610, 615), accelerator die(s) (e.g., 620), and input/output (I/O) tiles (e.g., 625) interconnected using a number of UCIe links (e.g., 630, 635, 640, 645). In some implementations, an accelerator 620 and/or I/O tile 625 can be connected to CPU device(s) 610, 615 using CXL transactions running on UCIe to thereby leverage the I/O, coherency, and memory protocols of CXL. The I/O tile can provide the external CXL, PCIe and DDR pins (e.g., 650, 655) of the package 605. The accelerator can also be connected to the CPU using PCIe transactions running on UCIe. The CPU-to-CPU connectivity on-package can also use the UCIe interconnect, running coherency protocols, among other examples. In some implementations, all component on an example SoC package may be interconnected using UCIe links. In other instances, one or more blocks (e.g., memory blocks 660, 665, 670, 675) may be connected using other protocols or links (e.g., DDR, etc.), among other example implementations.

A variety of packages may support UCIe links. For instance, a standard two-dimensional (2D) package may be utilized, as well 2.5D and 3D advanced packaging options, among other examples. FIG. 7 is a simplified block diagram illustrating an example application using a standard 2D package. A 2D package may be used for low cost and long reach (e.g., 10 mm to 25 mm) interconnects using traces 705, 708 on organic package/substrate 710, while still providing significantly better BER characteristics compared to off-package SERDES. As shown in FIG. 7, a first die 715 may be coupled to a second die 720 and a third die 725 by respective links implemented using traces (e.g., 705, 708) on the substrate 710.

Figure 8B:
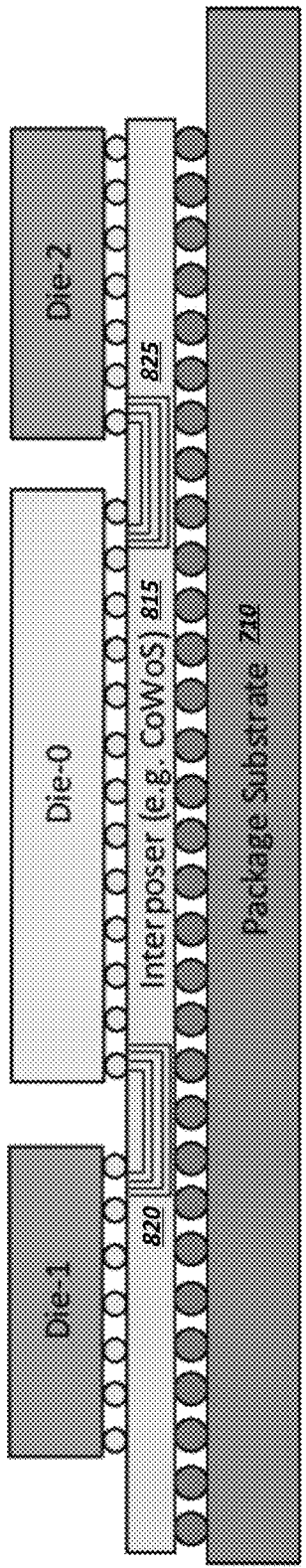
Figure 8C:
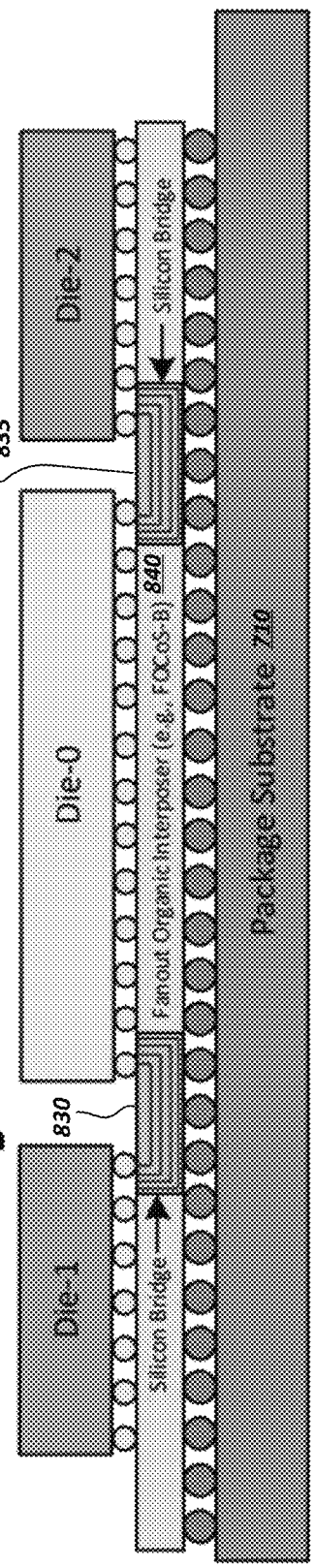
Figure 8D:
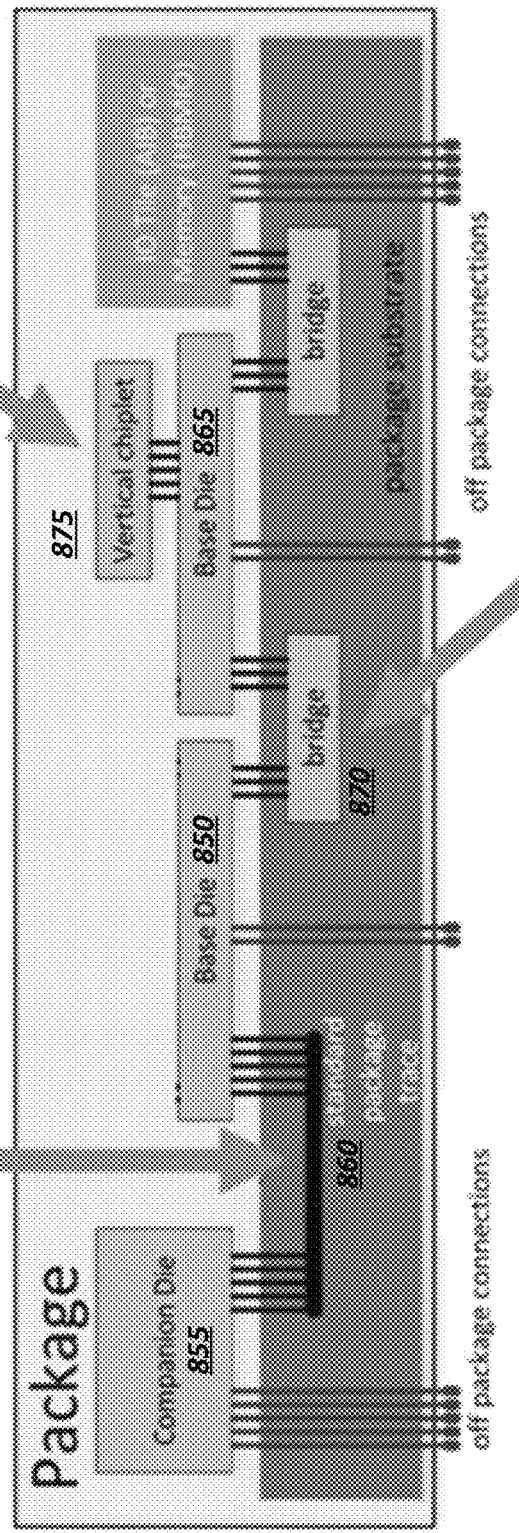

FIGS. 8A-8D are simplified block diagrams 800*a-d* showing example applications using a UCIe advanced (e.g., 2D) option. Such packaging technology may be used for performance optimized applications. Consequently, the channel reach is short (e.g., less than 2 mm) and the interconnect is expected to be optimized for high bandwidth and low latency with best performance and power efficiency characteristics. In one example, shown in FIG. 8A, links may be implemented on a silicon bridge 805, 810 (e.g., an Embedded Multi-die Interconnect Bridge (EMIB)). In the example of FIG. 8B, an interposer 815 on the package 710 and UCIe links (e.g., 820, 825) may be provided on the interposer 815 (e.g., in a Chip-on-Wafer-on-Substrate (CoWoS) application). In still another example of an advanced package, shown in FIG. 8C, silicon bridges (e.g., 830, 835) may be provided in a fanout organic interposer 840 which is provided on the package 710, and UCIe link may be implemented in the silicon bridges 830, 835. FIG. 8D shows another example in which a combination of standard and advanced options are employed. For instance, a base die 850 may be coupled to a companion die 855 in a 2D manner by a first link utilizing a standard package trace 860, while the base die 850 is coupled to another base die 865 by a bridge-based link 870. In another example, base die 865 couples via a 3D UCIe link to a vertical chiplet 875, among other example architectures and package applications.

Figure 9:
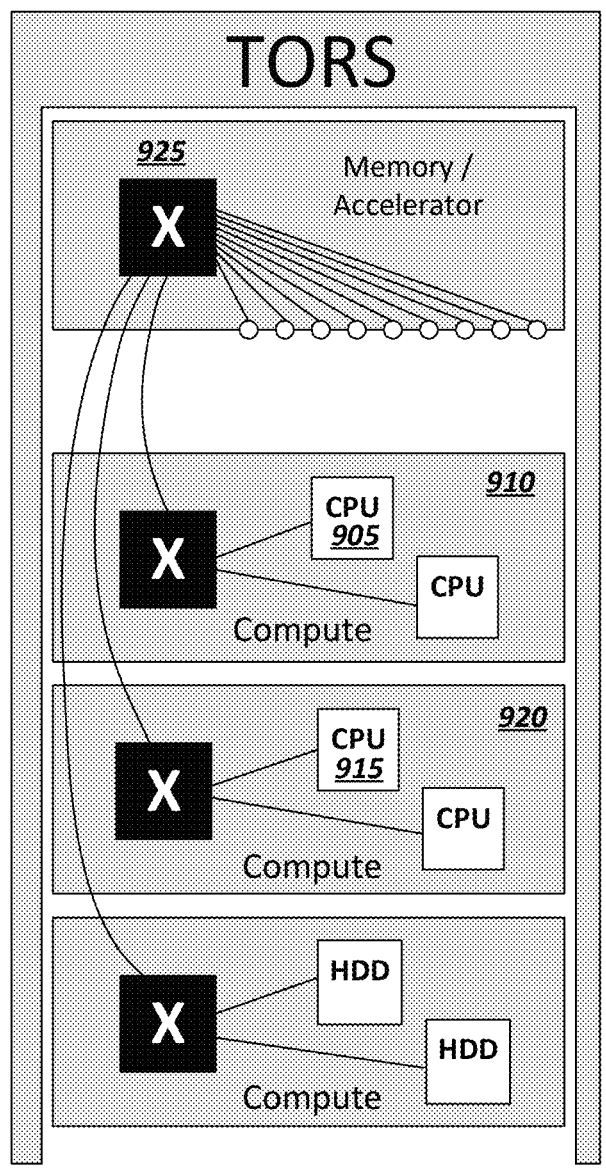
FIG. 9 is a simplified block diagram illustrating an example rack server with interconnected computing devices using a Universal Chiplet Interconnect Express (UCIe)-based protocol.

UCIe supports two broad usage models. The first usage model, as introduced above, involves package level integration to deliver power-efficient and cost-effective performance. Accordingly, components attached at the board level such as memory, accelerators, networking devices, modem, etc. can be integrated at the package level with applicability from hand-held to high-end servers with dies from multiple sources connected through different packaging options even on the same package. The second usage is to provide off-package connectivity using different types of media (e.g., optical, electrical cable, mmWave) using UCIe retimers to transport the underlying protocols (e.g., PCIe, CXL) at the rack or even the pod level for enabling resource pooling, resource sharing, and even message passing using load-store semantics beyond the node level to the rack/pod level to derive better power-efficient and cost-effective performance at the edge and data centers. FIG. 9 is a simplified block diagram showing an example rack server system (e.g., UCIe may be utilized to facilitate off-package connections, including server-scale interconnections between devices. In such implementations, retimers may be provided (e.g., a top of rack server (TORS)) on-package) to facilitate off-package connections. For instance, off-package UCIe links may be utilized to couple a device (e.g., processor device 905) on a first chassis 910 to another device (e.g., processor 915) on another second chassis 920 (e.g., via a switch device 925), among other example implementations.

Figure 10:
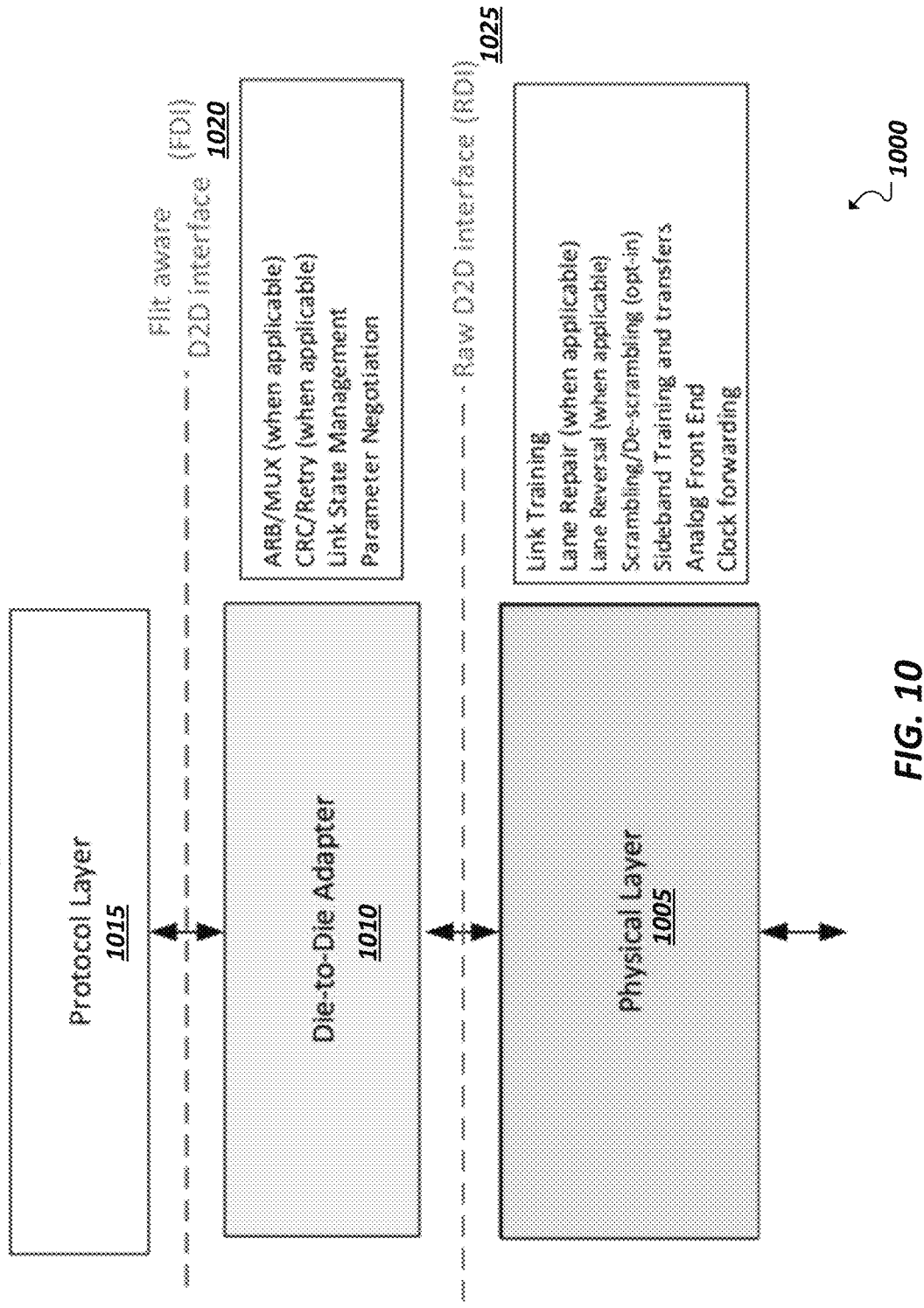
FIG. 10 is a simplified block diagram illustrating an example protocol stack of UCIe.

UCIe is a layered protocol, as illustrated in the block diagram 1000 of FIG. 10. The physical layer 1005 is responsible for the electrical signaling, clocking, link training, and sideband signaling. A die-to-die (D2D) adapter block 1010 provides the link state management and parameter negotiation for the chiplets. It optionally guarantees reliable delivery of data through its cyclic redundancy check (CRC) and link level retry mechanism. When multiple protocols are supported, the D2D adapter defines the underlying arbitration framework for arbitrating between data of the multiple protocols on the link. In one example implementation, UCIe may provide a 256-byte flit (or flow control unit) to define the underlying transfer mechanism when the adapter is responsible for reliable transfer. As noted above, one or more other interconnect protocols may be natively mapped to the flit format of UCIe. In one example, UCIe maps PCIe and CXL protocols to ensure seamless interoperability by leveraging the existing ecosystems of these protocols. For instance, with PCIe and CXL, SoC construction, link management, and security solutions that are already deployed can be leveraged to UCIe. The usage models addressed are also comprehensive: data transfer using direct memory access, software discovery, error handling, etc., are addressed with PCIe/CXL.io; the memory use cases are handled through CXL.Mem; and caching requirements for applications such as accelerators are addressed with CXL.cache, among other example benefits and use cases. UCIe also defines a "streaming protocol" which can be used to map any other protocol onto the flit format(s) defined in UCIe.

A protocol layer 1015 may be according to potentially any interconnect protocol, including protocols natively mapped to UCIe (e.g., CXL, PCIe, etc.), other well-defined or standardized interconnect protocols which can make use of UCIe's streaming or raw modes, or proprietary or vendor-defined protocols (which may likewise make use of UCIe's streaming or raw mode. The protocol layer may implement a transaction layer of the corresponding protocol, implement flow control schemes defined in the protocol, among other protocol-specific features. A logic block implementing the protocol layer 1015 (e.g., in software, firmware, and/or hardware) may interface with a UCIe D2D adapter 1010 using a flit-aware D2D interface (or FDI) 1020 and provide data according to the protocol to the D2D adapter for further processing. Data to be sent on the link using the PHY is received by the PHY from the D2D adapter 1010 over FDI. The FDI interface may be defined in the UCIe protocol specification and define a set of signals for communication and negotiation between the protocol layer block 1015 and D2D adapter block 1010. For instance, signals or messages may defined in the FDI 1020 whereby the D2D adapter 1010 informs the protocol layer (e.g., based on a negotiation with a link partner device (e.g., the D2D adapter of the link partner device)) the flit format to be utilized (e.g., a mapped flit format, streaming mode flit format, raw mode flit format, etc.), which the protocol layer 1015 may use to adapt data of the corresponding protocol for the identified flit format, among other examples.

Through the provision of streaming and raw modes, UCIe allows the option of transporting data of any protocol on a UCIe link. Protocol data can be transported in flit formats, or as raw fabric wires if needed. Some protocols may be explicitly mapped, allowing for on-board components such as accelerators, memory expanders, and I/O expanders to be moved on-package seamlessly. Flit modes include operating modes where error detection and/or error correction bits/bytes (e.g., CRC) are inserted into a defined flit format by the D2D adapter. Flit modes include operating modes where a flit of another, underlying protocol of the data (e.g., PCIe, UPI, CXL, GenZ, AXI, etc.) is mapped onto the UCIe flit format, as well as a streaming mode (where data of potentially any other protocol is encoded or populated into the flit format (e.g., which includes the CRC and any other designated fields defined in the UCIe flit)). Raw mode, on the other hand, is an operating mode where all bytes of the UCIe flit are populated by the protocol layer (and the D2D adapter accepts the flit as-is without adding CRC, Retry, or other values into the flit and transfers data from the protocol layer to the physical layer without any modification). In some instances, CRC, Retry, FEC, etc. in raw mode may be handled entirely by the protocol layer (rather than the UCIe D2D adapter), among other examples.

In some implementations, a D2D adapter 1010 may be provided as a distinct block of circuitry (e.g., from that implementing the protocol layer block and/or the physical layer block 1005). In other implementations, one or both of the logic implementing of the protocol layer or the physical layer may be collocated or integrated with the logic (e.g., hardware circuitry) implementing the D2D adapter block 1010, among other example implementations. A D2D adapter 1010 coordinates with the protocol layer 1015 (e.g., via FDI 1020) and the physical layer 1005 (e.g., via raw D2D interface (RDI) 1025) to ensure successful and reliable data transfer across a UCIe link. Each of these standardized interfaces (e.g., FDI and RDI) may be standardized through a defined set of pins (for physical interconnection of the respective protocol stack blocks), a defined set of signals, states, and state transitions to standardize the way in which the respective protocol stack blocks interact and coordinate. Providing such standardized interfaces (e.g., FDI and RDI) to couple blocks (e.g., IP blocks) implementing respective layers of the protocol allows vendors and SoC builders to easily mix and match different layers from different IP providers at low integration cost and faster time to market.

(e.g., enabling a Protocol Layer block to work with the D2D Adapter and Physical Layer block from any different vendor that conforms to the interface handshakes provided in this specification). Further, given that interoperability testing during post-silicon has greater overhead and cost associated with it, a consistent understanding and development of Bus Functional Models (BFMs) based on such interfaces may allow easier IP development for such UCIe protocol stack implementations, among other example benefits.

The D2D adapter 1010 helps facilitate the minimization of logic in the main data path to realize a highly latency-optimized data path for protocol flits. The D2D adapter may include logic to implement various functionality that may be leveraged by various protocols (of protocol layer 1015), such arbitration and multiplexor functionality, error detection and/or error correction codes (e.g., cyclic redundancy check (CRC)), retry scheme, among other example features. As an example, a protocol layer implementing CXL may be coupled to a D2D adapter. When transporting CXL protocol, the ARB/MUX functionality of the D2D adapter 1010 may be utilized to perform arbitration/multiplexing of the multiple sub-protocols of CXL (e.g., CXL.mem, CXL.io, CXL.cache). Error detection, error correction, retry, and other functionality provided by the D2D adapter 1010 may be utilized to support targeted bit error rate (BER) requirements (e.g., based on the speed to be implemented on the link). For instance, where the raw BER is less than 1e-27, a CRC and retry scheme may be provided by the D2D adapter 1010. Additionally, the D2D adapter 1010 may be responsible for coordinating higher level link state machine and link bring up protocols, protocol options related to parameter exchanges with remote link partner, and when supported, power management coordination with remote link partner. For instance, two link partner devices to be coupled using a UCIe link may utilize their respective D2D adapters to perform training of the link (e.g., through the progression through various link states defined in a link state machine) and determination of parameters to be used during operation of the link, among other examples.

A communication port of a computing device may be constructed from a protocol logic block, a D2D adapter block, and a physical layer block. The protocol logic block may interface with the D2D adapter block via a FDI interface and the D2D adapter may interface with the physical layer block using an RDI interface. Each of the FDI and RDI interfaces may be implemented using physical pins, traces, conductors, or other communication pathways, over which the respective signals of the defined interface may be communicated. The protocol logic block (e.g., 1015), D2D adapter block (e.g., 1010), and physical layer block (e.g., 1015) implement respective layers of the UCIe protocol and enable their device to establish a UCIe-compliant link and communicate with another link partner computing device using the UCIe protocol.

The physical layer of a UCIe stack may be implemented through a number of physical layer modules to form the physical layer of a corresponding link. The module forms the main data path (e.g., on the physical bumps or pins of the port) and is organized as a grouping of lanes. A module forms the atomic granularity for the structural design implementation of UCIe's analog front end (AFE). The number of lanes per module may be based on whether a Standard or Advanced package is utilized in the implementations. A single D2D adapter may be coupled to a physical layer implemented as one or multiple modules (for bandwidth scaling). The physical link (and each module making up the physical layer) of UCIe may include a sideband connection (made up of a first subset of the lanes) and a mainband connection made up of a second subset of the lanes of the physical layer). The mainband connection of a UCIe module/physical layer provide the main data path in UCIe. The mainband connection may include a forwarded clock, a data valid pin, and N data lanes per module. The sideband connection is used for parameter exchanges, register accesses for debug/compliance, and coordination with remote partner for link training and management. The sideband connection may include a forwarded clock pin and a data pin in each direction. In one example implementation, a forwarded clock may be fixed at a frequency of 800 MHz regardless of the main data path speed (e.g., at a different frequency than the main data path (mainband) speed). In some implementations, the sideband logic for UCIe's physical layer may be powered using auxiliary power to place the sideband logic in an "always on" domain. Each module may include its own respective set of sideband pins/bumps/lanes.

Figure 11:
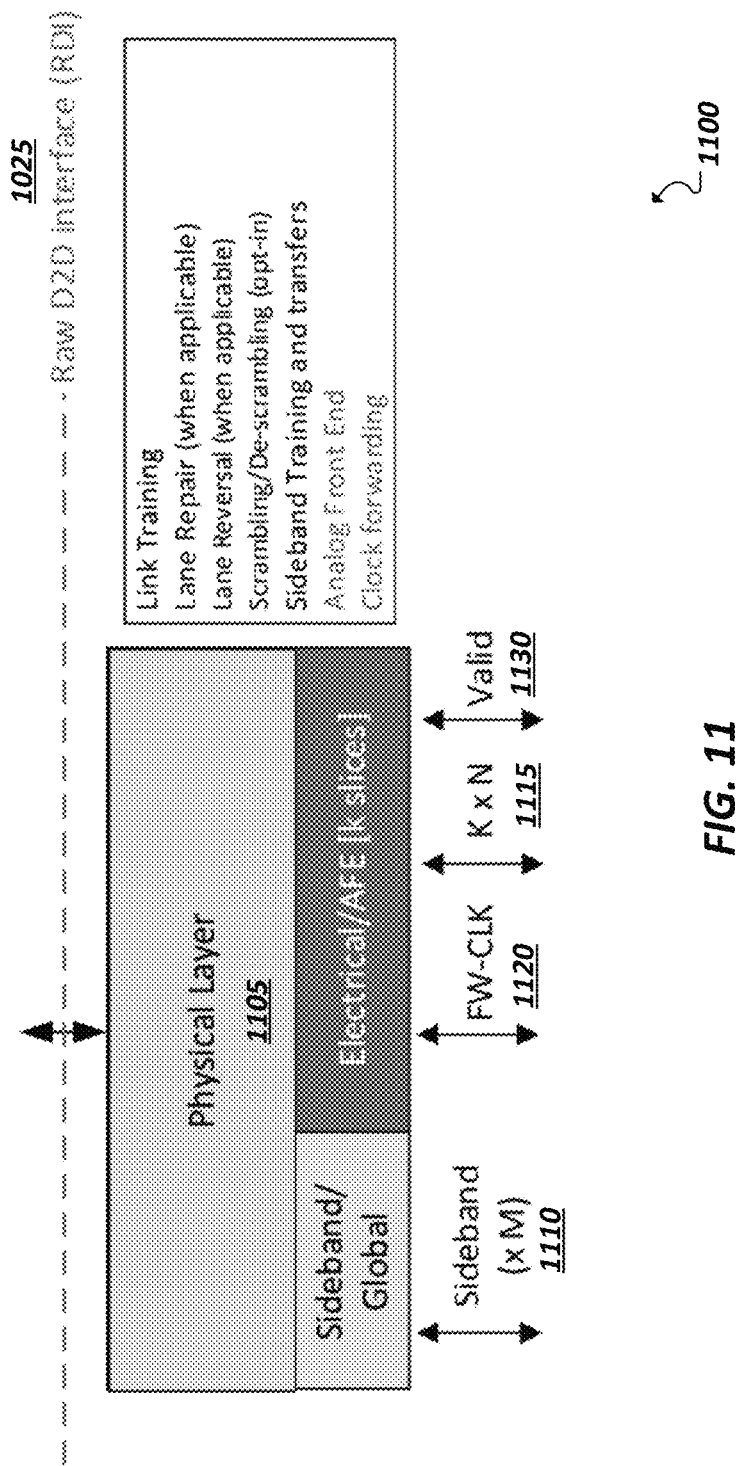
FIG. 11 is a simplified block diagram of an example physical layer block.

FIG. 11 is a simplified block diagram 1100 illustrating an example physical layer block of a UCIe device. The physical layer may include a logical physical layer (logical PHY) 1105, or PHY logic, and a number (M) of sideband lanes 1110 and a number (N) of mainband lanes 1115. As noted above, the mainband lanes may include one or more forward clock lanes 1120, a number of data lanes 1125, and a valid lane 1130. The logical PHY 1105 may perform link training, lane repair, lane reversal, scrambling/descrambling, sideband training and transfers, among other functions for the link. The physical layer may couple to a D2D adapter (e.g., implemented on a separate hardware or IP block) via a RDI interface 1025.

Figure 12A:
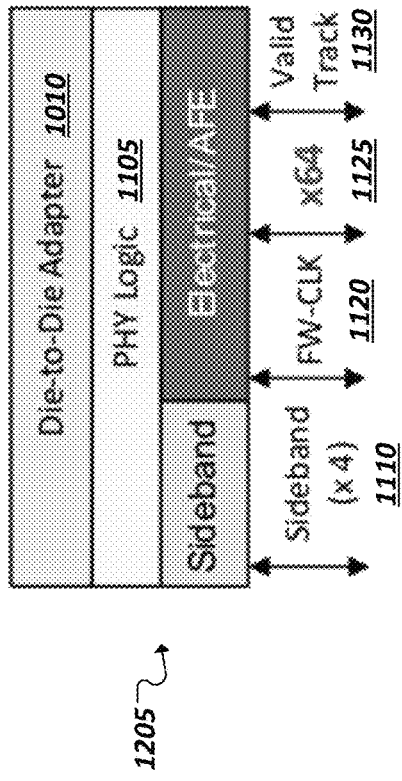
FIGS. 12A-12C are simplified block diagrams of example protocol stack implementations.
Figure 12B:
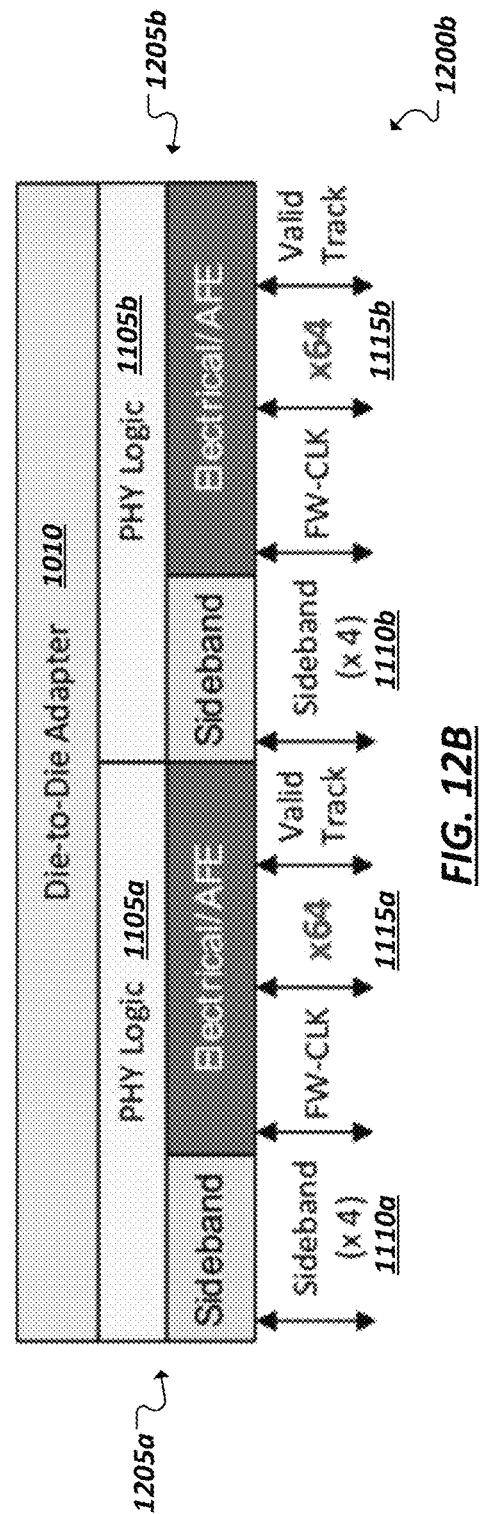
Figure 12C:
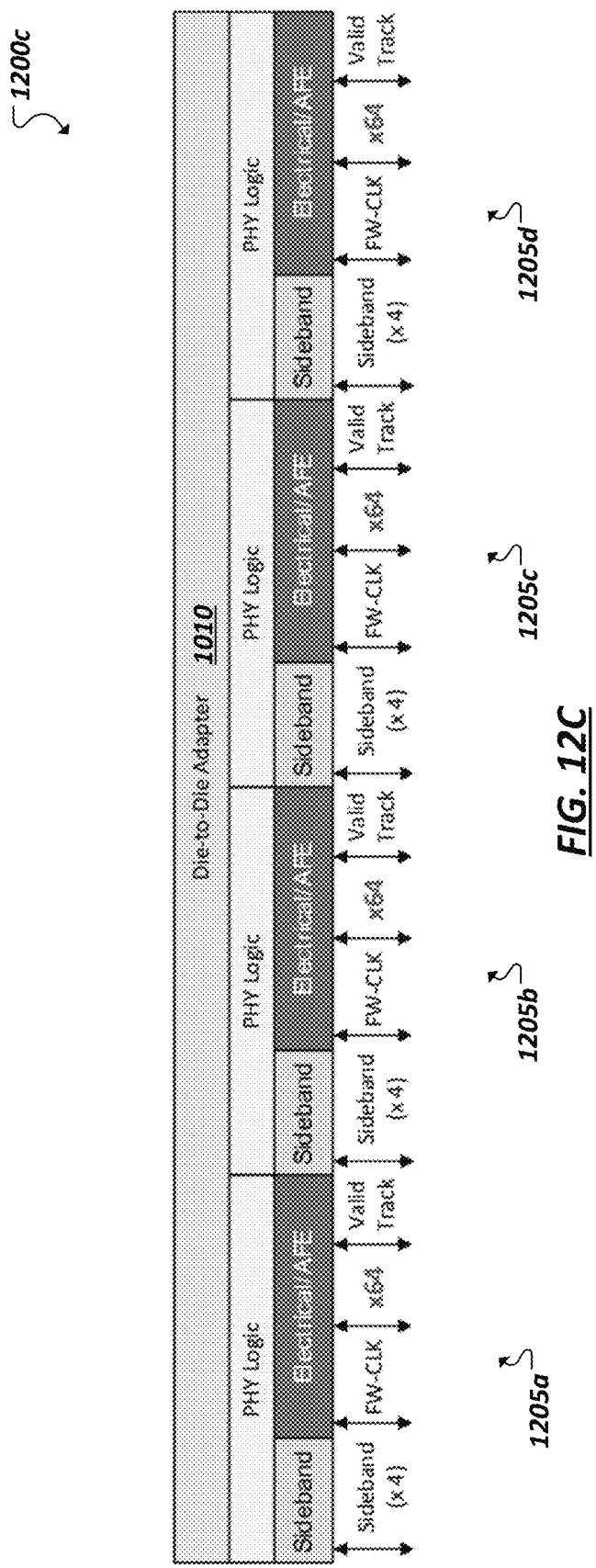

Turning to FIGS. 12A-12C, simplified block diagrams 1200a-c are shown illustrating example UCIe protocol stacks, where different numbers of PHY modules are utilized to implement the respective physical layer of the UCIe protocol stack. In one example, PHY modules may be defined to each provide 4 sideband lanes 1110, and 64 data lanes 1125. In FIG. 12A, an example implementation is shown where a single module 1205 is used to connect to the D2D adapter 1010 implement the physical layer of the port. FIG. 12B shows another example implementation, where two modules 1205a-b are utilized to implement the physical layer. Each module 1205a-b has its own logical PHY (e.g., 1105a,b), set of sideband lanes (e.g., 1110a,b), and set of mainband lanes (e.g., 1115a,b). The use of two modules 1205a-b effectively doubles the bandwidth of the link as compared to implementations using only a single module, such as in FIG. 12A. The two modules 1205a-b connect to a single D2D adapter 1010. In still another example, shown in FIG. 12C, a physical layer implementation is shown, constructed using 4 modules 1205a-d to further scale the bandwidth of the link (e.g., by providing four ×64 data lane groupings in each of the 4 modules to form a ×320 data width), among other examples (which may include other numbers of defined PHY modules to implement the physical layer for a port).

In accordance with the above, UCIe may support different data rates, widths, bump-pitches, and channel reach to ensure the widest interoperability feasible. The sideband interface is defined for ease of design and validation. Using PHY modules as the unit of construction of the interconnect provides N single-ended, unidirectional, full-duplex data Lanes (e.g., N=16 for standard package and N=64 for advanced package), one single-ended lane for Valid, one lane for tracking, a differential forwarded clock per direction, and four lanes (e.g., 2 per direction) for sideband signaling (e.g., single-ended, one 800 MHz clock and one data). Multiple clusters can be aggregated to deliver more performance per link.

In addition to the features above, an advanced package option in UCIe may be provided to support still additional features. For instance, an advanced package may support spare lanes to handle faulty lanes through pair (e.g., extras lanes for clock, valid, sideband, etc. for repair purposes), whereas the standard package supports width degradation to handle failures. A die with the standard package design may be expected to interoperate with any other design on the standard package. Similarly, a die with the advanced package design may be expected to interoperate with any other die designed for the advanced package (e.g., even within the wide range of bump pitch from 25u to 55u). Generally, the standard package (2D) is used for cost-effective performance. The advanced packaging may be used for power-efficient performance. Table 1 below summarizes example key performance targets for an example UCIe implementation:

TABLE 1

Example Key Performance Indicators (KPIs)

| Metric | | Advanced Package | Standard Package |
|---|---|---|---|
| Die Edge Bandwidth Density (GB/s per mm) | 4 GT/s | 165 | 28 |
| | 8 GT/s | 329 | 56 |
| | 12 GT/s | 494 | 84 |
| | 16 GT/s | 658 | 112 |
| | 24 GT/s | 988 | 168 |
| | 32 GT/s | 1317 | 224 |
| Energy Efficiency (pJ/bit) | 0.7 V | 0.5 (<=12 GT/s) | 0.5 (4 GT/s, short reach) |
| | | 0.6 (>=16 GT/s) | 1.0 (<=16 GT/s, long reach) |
| | | — | 1.25 (32 GT/s, long reach) |
| | 0.5 V | 0.25 (<=12 GT/s) | 0.5 (<=16 GT/s, long reach) |
| | | 0.3 (>=16 GT/s) | 0.75 (32 GT/s, long reach) |
| Latency Target | | | <=2 ns |

Where it is assumed that Die Edge Bandwidth Density is with 45 um (Advanced Package) and 110 um (Standard Package) bump pitch, Energy Efficient includes all the PHY-related circuitry (e.g., transmitter, receiver, phase locked loop (PLL), and Latency include the latency of the D2D adapter and the physical layer on the transmitter and receiver, among other examples.

As introduced above, retimers may be used to extend the UCIe connectivity beyond the package using off-package links (e.g., electrical or optical cable communication media), for instance, to connect packages at a rack/pod level. A UCIe retimer implements the UCIe interface to the die that it connects on its local package and ensures that the flits are delivered across the two dies on different packages following the UCIe protocol. UCIe can also be used for transport any protocol including load-store protocols such as PCIe or CXL over long-reach alternate media such as optical. For instance, as one example implementations, a rack/pod-level disaggregation may be implemented using CXL 2.0 (or later) protocol. In this example, at the rack level, multiple compute nodes (e.g., in a virtual hierarchy) from different compute chassis connect to a CXL switch which connects to multiple CXL accelerators and/or Type-3 memory devices which can be placed in one or more separate drawer. In this example, each host may be implemented a compute drawer and each compute drawer connects to the switch using optical connection running CXL protocol through a UCIe-based optical tile. The switch may also have co-package optics where the optical tiles connect to the main switch die using UCIe and on the other side PCIe/CXL physical interconnects are used to connect to the accelerators/memory devices, among numerous other example implementations where UCIe links enable off-package connections.

Figure 13:
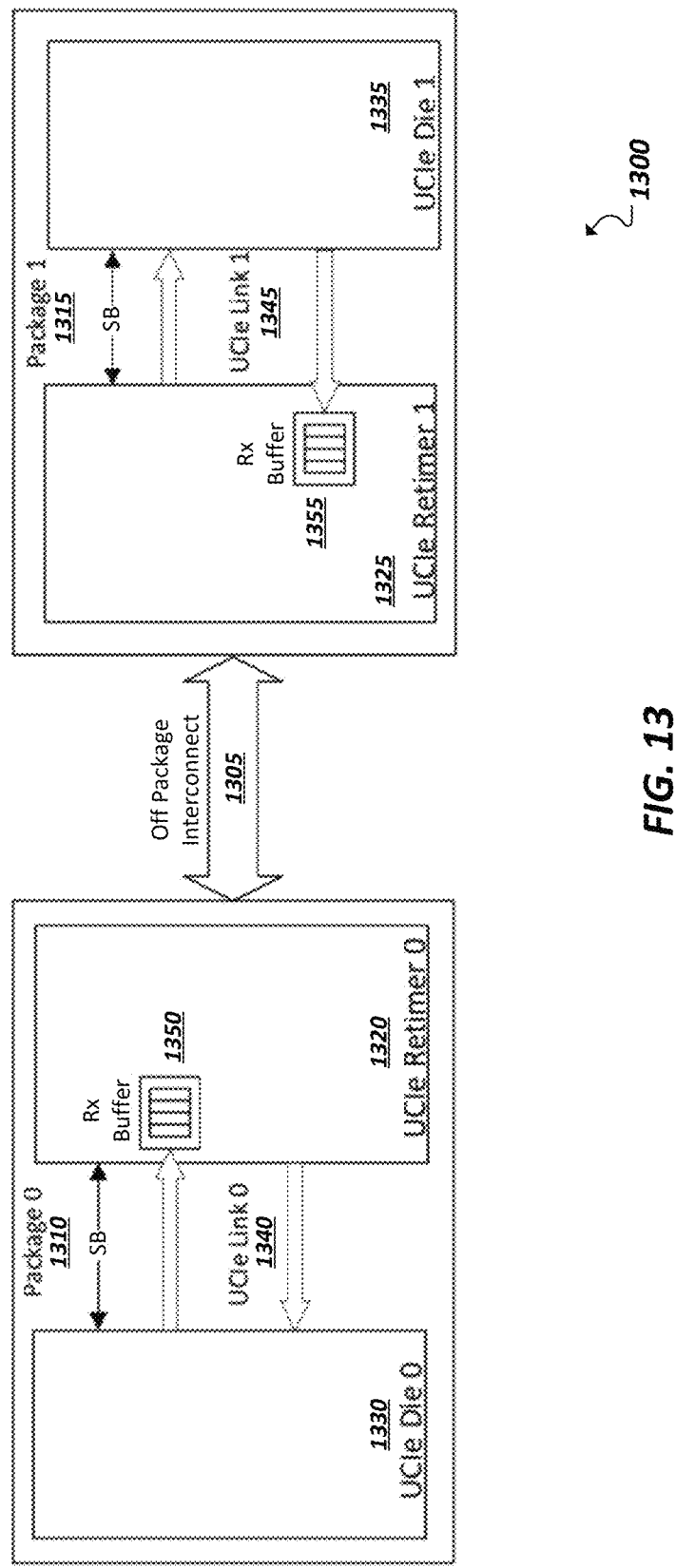
FIG. 13 is a simplified block diagram of a computing system including two packages connected by a UCIe-based interconnect.

Turning to FIG. 13, a simplified block diagram 1300 is shown illustrating an example system including two packages (e.g., 1310, 1315) connected by a UCIe link 1305. As introduced above, UCIe retimers may be used to enable different types of off-package interconnects 1305 to extend the channel reach between two UCIe dies on different packages (e.g., 1310, 1315). A respective UCIe retimer (e.g., 1320, 1325) may be provided at each package to enable the off-package UCIe link (e.g., 1305). Further, each package's UCIe retimer 1320, 1325 may be coupled to one or more of the dies (e.g., 1330, 1335) on its package by a respective UCIe link (e.g., 1340, 1345). The die (e.g., 1330, 1335) may forward data to the corresponding retimer (e.g., 1320, 1325) for communication to the other die on the other package over the off-package link 1305 facilitated through the retimer. Relative to the on-package link (e.g., 1340) coupling the retimer (e.g., 1320) to an on-package die (e.g., 1330), the off-package link may be considerably longer in physical length. The off-package retimer (e.g., 1325) to which the retimer (e.g., 1320) is connected using the off-package link 1305 may be referred to as the "remote retimer partner."

The responsibility of each UCIe retimer (e.g., 1320, 1325) in an example system may include the reliably transport of flits over the off-package interconnect 1305. In one example, the retimer (e.g., 1320, 1325) is configured to implement and support the use of a forward error correct (FEC) and error detection (e.g., cyclic redundancy check (CRC)) natively defined by the underlying specification of the protocol it carries (e.g., PCIe or CXL) as long as the external interconnect conforms to the underlying error model (e.g., BER and error correlation) of the specification corresponding to the protocol it transports. In such an example, the UCIe links may be configured to utilize the raw mode to tunnel native bits of the protocol it transports (e.g., PCIe or CXL flits). In this scenario, the queue sizes (e.g., protocol layer buffers) are adjusted on the UCIe dies to meet the underlying round trip latency. In another example, the retimer may be configured to support and provide the defined FEC, CRC and Retry capabilities to handle the BER of the off-package interconnect. In this case, the flits undergo three independent links; each UCIe retimer performs an independent Ack/Nak for Retry with the UCIe die within its package and a separate independent Ack/Nak for Retry with the remote retimer partner. As another example, the retimer may provide its own FEC by replacing the native protocol's (e.g., PCIe- or CXL) defined FEC with its own, or adding its FEC in addition to the native protocol's defined FEC, but takes advantage of the built-in CRC and Replay mechanisms of the underlying protocol. In this example, the queue sizes (e.g., Protocol Layer buffers, Retry buffers, etc.) must be adjusted on the UCIe dies to meet the underlying round trip latency.

UCIe retimers may also be responsible for the resolution of link layer and protocol layer parameters with its remote retimer partner to ensure interoperability between UCIe dies end-to-end (E2E). For example, retimers (e.g., 1320, 1325) are permitted to force the same link width, speed, protocol (including any relevant protocol specific parameters), and flit formats on both packages (e.g., 1310, 1315). The specific mechanism of resolution, including message transfer for parameter exchanges across the Off Package Interconnect, may be implementation-specific for the retimers and they must ensure a consistent operational mode taking into account their own capabilities along with the UCIe die (e.g., 1330, 1335) capabilities on both packages (e.g., 1310, 1315). However, for robustness of the UCIe links (e.g., 1340, 1345) and to avoid unnecessary timeouts in case the external interconnect 1305 requires a longer time to link up or resolution of parameters with remote retimer partner, a "Stall" response may be defined to the relevant sideband messages that can potentially get delayed. The retimers can respond with the "Stall" response (e.g., according to specification-defined rules) to avoid such unnecessary timeouts while waiting for, or negotiating with, its remote retimer partner. It is the responsibility of the retimer to ensure the UCIe link is not stalled indefinitely. As another feature, UCIe retimers (e.g., 1320, 1325) may be responsible for managing link states defined for the D2D adapter (e.g., an Adapter Link State Machine (LSM)) or the RDI states with its remote retimer partner to ensure correct E2E operation, among other example considerations.

Retimers may additionally provide flow control and back pressure management logic to manage data transmitted from its on-package UCIe die (e.g., 1330, 1335). For instance, data transmitted from a UCIe die to a UCIe retimer may be flow-controlled using credits. Credits used to manage this link (e.g., 1340, 1345) may be in addition to any credit protocol defined for the underlying protocol of the data being sent (e.g., PRH, PRD credits in PCIe). UCIe die-to-die (D2D) credits may be defined for flow control across the two UCIe retimers and any data transmitted to the UCIe retimer is to be eventually consumed by the remote UCIe die without any other dependency. A UCIe retimer (e.g., 1320, 1325) may implement a receiver (Rx) buffer (e.g., 1350, 1355) for flits it receives from the UCIe die (e.g., 1330, 1335) within its package. The receiver buffer credits are advertised to the UCIe die during initial parameter exchanges for the D2D adapter, and the UCIe die may be required to not send any data to the UCIe retimer if it does not have a credit for the transmission. In one example implementations, one credit corresponds to 256B of data (including any FEC, CRC etc.). Credit returns, in one example implementation, may be overloaded or encoded on/in the Valid framing signal. Credit counters at the UCIe die may be reassigned to initial advertised value whenever RDI states transition away from Active. A UCIe retimer may drain or dump (as applicable) the data in its receiver buffer before re-entering Active state. In some examples, data transmitted from a UCIe retimer to a UCIe die may not be flow controlled at the D2D adapter level. The UCIe retimer, instead, may have its independent flow-control with the other UCIe retimer if needed, among other example implementations.

Dies that are to be connected in a package using a UCIe link are to be interoperable and compatible. This includes compatible package interconnect (e.g., advanced vs standard), protocols, voltage levels, etc. In some implementations, dies may adopt a particular transmitter voltage ceiling (e.g., less than 0.85V) so that they can inter-operate with a wide range of process nodes in the foreseeable future. Interoperability may be defined across a wide range of bump pitch for advanced packaging options. In some instances, the smaller bump pitches may be predominantly used. With smaller bump pitch, designs may reduce the maximum advertised frequency (even though they can go to 32G) to optimize for area and to address the power delivery and thermal constraints of high bandwidth with reduced area. Table 2 summarizes example bump pitches across four groups:

TABLE 2

Example Groups for Different Bump Pitches

| Bump Pitch (um) | Minimum Frequency (GT/s) | Expected Maximum Frequency (GT/s) |
| --- | --- | --- |
| Group 1: 25-30 | 4 | 12 |
| Group 2: 31-37 | 4 | 16 |
| Group 3: 38-44 | 4 | 24 |
| Group 4: 45-55 | 4 | 32 |

Interoperability may be guaranteed within each group as well as across groups, based on the respective PHY dimensions.

Note that the apparatus', methods', and systems described above may be implemented in any electronic device or system as aforementioned. As specific illustrations, the figures below provide exemplary systems for utilizing the solutions as described herein. As the systems below are described in more detail, a number of different interconnects are disclosed, described, and revisited from the discussion above. While some of the examples above were based on CXL- or PCIe-based interconnects and devices, it should be appreciated that the solutions and features discussed above may be just as readily applied to other interconnect or protocol used to couple sockets, packages, boards, and the like within various computing platforms. As is readily apparent, the advances described above and UCIe-based protocols may be applied to any of the interconnects, fabrics, or architectures discussed herein, as well as other comparable interconnects, fabrics, or architectures not explicitly named or illustrated herein.

Figure 14:
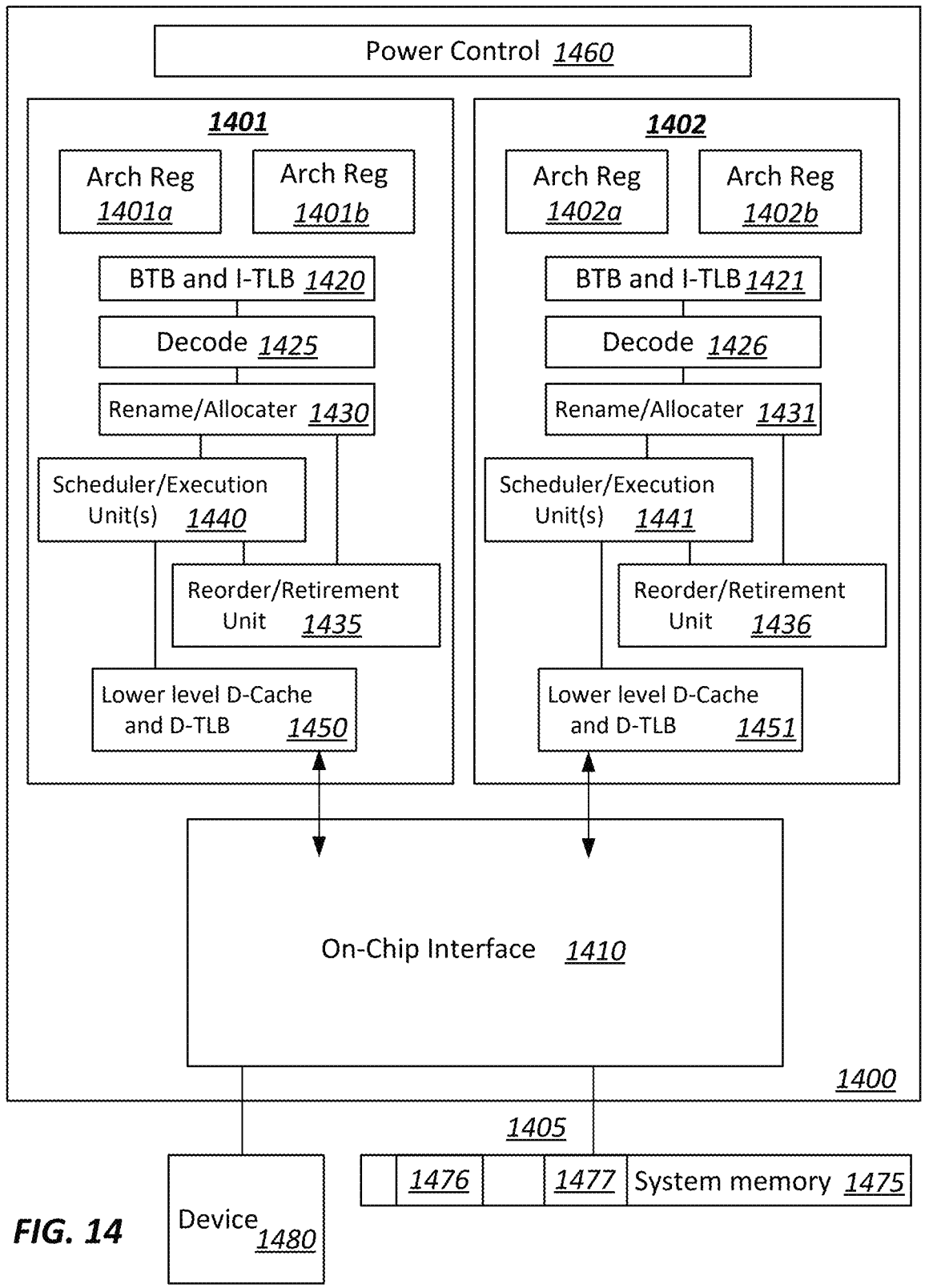
FIG. 14 illustrates an embodiment of a block diagram for a computing system including a multicore processor.

Referring to FIG. 14, an embodiment of a block diagram for a computing system including a multicore processor is depicted. Processor 1400 includes any processor or processing device, such as a microprocessor, an embedded processor, a digital signal processor (DSP), a network processor, a handheld processor, an application processor, a co-processor, a system on a chip (SOC), or other device to execute code. Processor 1400, in one embodiment, includes at least two cores—core 1401 and 1402, which may include asymmetric cores or symmetric cores (the illustrated embodiment). However, processor 1400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1400, as illustrated in FIG. 14, includes two cores—core 1401 and 1402. Here, core 1401 and 1402 are considered symmetric cores, i.e. cores with the same configurations, functional units, and/or logic. In another embodiment, core 1401 includes an out-of-order processor core, while core 1402 includes an in-order processor core. However, cores 1401 and 1402 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1401 are described in further detail below, as the units in core 1402 operate in a similar manner in the depicted embodiment.

As depicted, core 1401 includes two hardware threads 1401a and 1401b, which may also be referred to as hardware thread slots 1401a and 1401b. Therefore, software entities, such as an operating system, in one embodiment potentially view processor 1400 as four separate processors, i.e., four logical processors or processing elements capable of executing four software threads concurrently. As alluded to above, a first thread is associated with architecture state registers 1401a, a second thread is associated with architecture state registers 1401b, a third thread may be associated with architecture state registers 1402a, and a fourth thread may be associated with architecture state registers 1402b. Here, each of the architecture state registers (1401a, 1401b, 1402a, and 1402b) may be referred to as processing elements, thread slots, or thread units, as described above. As illustrated, architecture state registers 1401a are replicated in architecture state registers 1401b, so individual architecture states/contexts are capable of being stored for logical processor 1401a and logical processor 1401b. In core 1401, other smaller resources, such as instruction pointers and renaming logic in allocator and renamer block 1430 may also be replicated for threads 1401a and 1401b. Some resources, such as re-order buffers in reorder/retirement unit 1435, ILTB 1420, load/store buffers, and queues may be shared through partitioning. Other resources, such as general purpose internal registers, page-table base register(s), low-level data-cache and data-TLB 1415, execution unit(s) 1440, and portions of out-of-order unit 1435 are potentially fully shared.

Processor 1400 often includes other resources, which may be fully shared, shared through partitioning, or dedicated by/to processing elements. In FIG. 14, an embodiment of a purely exemplary processor with illustrative logical units/resources of a processor is illustrated. Note that a processor may include, or omit, any of these functional units, as well as include any other known functional units, logic, or firmware not depicted. As illustrated, core 1401 includes a simplified, representative out-of-order (OOO) processor core. But an in-order processor may be utilized in different embodiments. The OOO core includes a branch target buffer 1420 to predict branches to be executed/taken and an instruction-translation buffer (I-TLB) 1420 to store address translation entries for instructions.

Core 1401 further includes decode module 1425 coupled to fetch unit 1420 to decode fetched elements. Fetch logic, in one embodiment, includes individual sequencers associated with thread slots 1401a, 1401b, respectively. Usually core 1401 is associated with a first ISA, which defines/specifies instructions executable on processor 1400. Often machine code instructions that are part of the first ISA include a portion of the instruction (referred to as an opcode), which references/specifies an instruction or operation to be performed. Decode logic 1425 includes circuitry that recognizes these instructions from their opcodes and passes the decoded instructions on in the pipeline for processing as defined by the first ISA. For example, as discussed in more detail below decoders 1425, in one embodiment, include logic designed or adapted to recognize specific instructions, such as transactional instruction. As a result of the recognition by decoders 1425, the architecture or core 1401 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1426, in one embodiment, recognize the same ISA (or a subset thereof). Alternatively, in a heterogeneous core environment, decoders 1426 recognize a second ISA (either a subset of the first ISA or a distinct ISA).

In one example, allocator and renamer block 1430 includes an allocator to reserve resources, such as register files to store instruction processing results. However, threads 1401a and 1401b are potentially capable of out-of-order execution, where allocator and renamer block 1430 also reserves other resources, such as reorder buffers to track instruction results. Unit 1430 may also include a register renamer to rename program/instruction reference registers to other registers internal to processor 1400. Reorder/retirement unit 1435 includes components, such as the reorder buffers mentioned above, load buffers, and store buffers, to support out-of-order execution and later in-order retirement of instructions executed out-of-order.

Scheduler and execution unit(s) block 1440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1450 are coupled to execution unit(s) 1440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1401 and 1402 share access to higher-level or further-out cache, such as a second level cache associated with on-chip interface 1410. Note that higher-level or further-out refers to cache levels increasing or getting further way from the execution unit(s). In one embodiment, higher-level cache is a last-level data cache—last cache in the memory hierarchy on processor 1400—such as a second or third level data cache. However, higher level cache is not so limited, as it may be associated with or include an instruction cache. A trace cache—a type of instruction cache—instead may be coupled after decoder 1425 to store recently decoded traces. Here, an instruction potentially refers to a macro-instruction (i.e. a general instruction recognized by the decoders), which may decode into a number of micro-instructions (micro-operations).

In the depicted configuration, processor 1400 also includes on-chip interface module 1410. Historically, a memory controller, which is described in more detail below, has been included in a computing system external to processor 1400. In this scenario, on-chip interface 1410 is to communicate with devices external to processor 1400, such as system memory 1475, a chipset (often including a memory controller hub to connect to memory 1475 and an I/O controller hub to connect peripheral devices), a memory controller hub, a northbridge, or other integrated circuit. And in this scenario, bus 1405 may include any known interconnect, such as multi-drop bus, a point-to-point interconnect, a serial interconnect, a parallel bus, a coherent (e.g. cache coherent) bus, a layered protocol architecture, a differential bus, and a GTL bus. Bus 1405, as well as other links, interconnects, and fabrics interconnecting elements in the system of FIG. 14 may be implemented using UCIe, according to the principles discussed above. In some implementations, one or more of the elements shown in the system of FIG. 14 may be provided and interconnected on the same package. In some instances, some of the interconnected elements may be on different packages and coupled by off-package links, among other examples.

Memory 1475 may be dedicated to processor 1400 or shared with other devices in a system. Common examples of types of memory 1475 include DRAM, SRAM, non-volatile memory (NV memory), and other known storage devices. Note that device 1480 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1400. For example in one embodiment, a memory controller hub is on the same package and/or die with processor 1400. Here, a portion of the core (an on-core portion) 1410 includes one or more controller(s) for interfacing with other devices such as memory 1475 or a graphics device 1480. The configuration including an interconnect and controllers for interfacing with such devices is often referred to as an on-core (or un-core configuration). As an example, on-chip interface 1410 includes a ring interconnect for on-chip communication and a high-speed serial point-to-point link 1405 for off-chip communication. Yet, in the SOC environment, even more devices, such as the network interface, co-processors, memory 1475, graphics processor 1480, and any other known computer devices/interface may be integrated on a single die or integrated circuit to provide small form factor with high functionality and low power consumption.

In one embodiment, processor 1400 is capable of executing a compiler, optimization, and/or translator code 1477 to compile, translate, and/or optimize application code 1476 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 15:
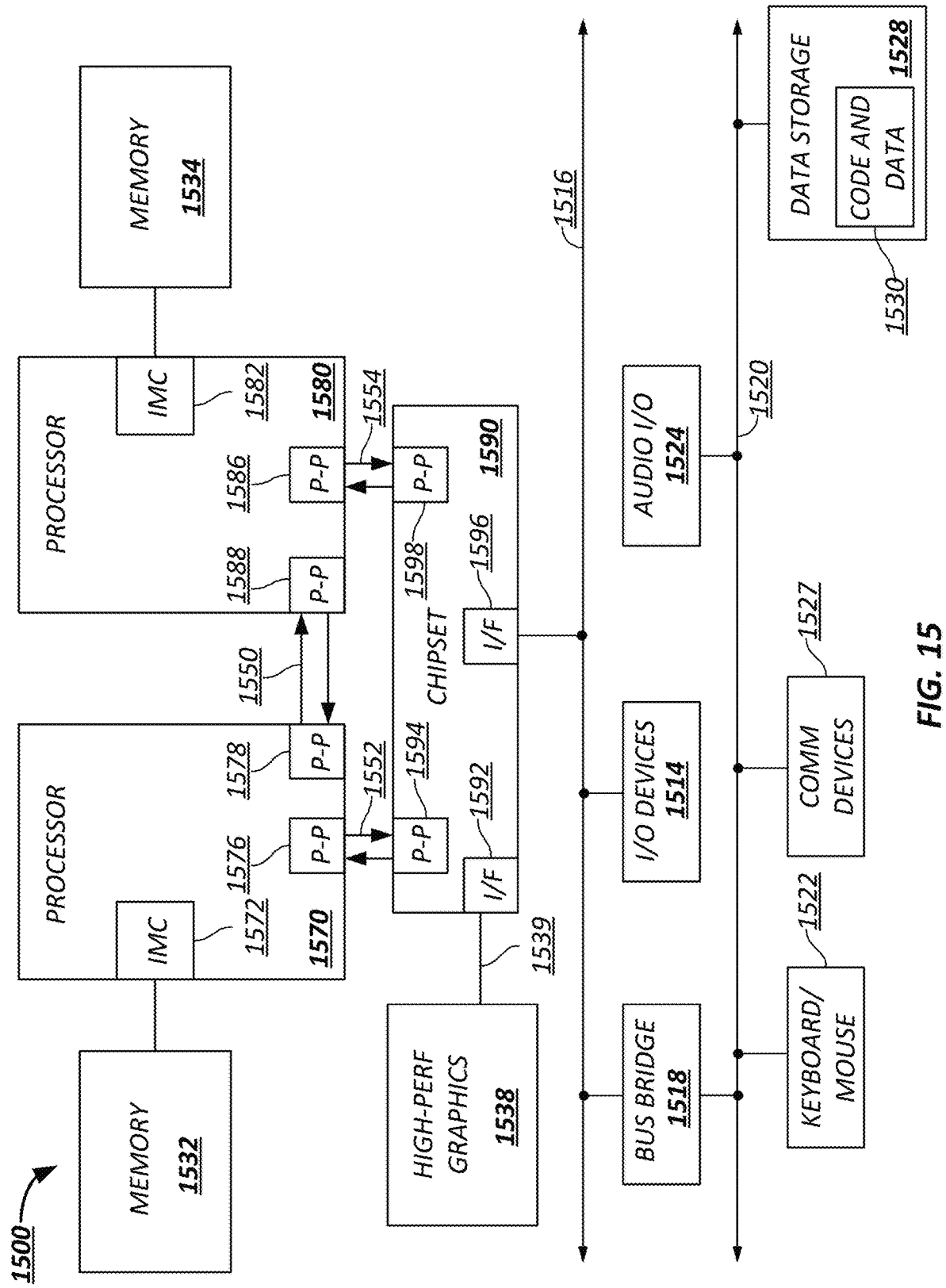
FIG. 15 illustrates an embodiment of a block for a computing system including multiple processors.

Referring now to FIG. 15, shown is a block diagram of a second system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Links, buses, interconnects, and fabrics interconnecting elements in the system may be implemented using UCIe, according to the principles discussed above. In some implementations, one or more of the elements shown in the system of FIG. 15 may be provided and interconnected on the same package. In some instances, some of the interconnected elements may be on different packages and coupled by off-package links, among other examples. Each of processors 1570 and 1580 may be some version of a processor. In one embodiment, 1552 and 1554 are part of a serial, point-to-point coherent interconnect fabric, such as a high-performance architecture. As a result, the solutions described herein may be implemented within a UPI or other architecture.

While shown with only two processors 1570, 1580, it is to be understood that the scope of the present disclosure is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598. Chipset 1590 also exchanges information with a high-performance graphics circuit 1538 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

While the solutions discussed herein have been described with respect to a limited number of embodiments, those skilled in the art will appreciate numerous modifications and variations therefrom. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosures.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform example embodiments herein may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: a port to couple to another die over a die-to-die (D2D) link, where the port includes: physical layer (PHY) circuitry including: a logical PHY; a first number of sideband lane pins, where the sideband lane pins are to carry data for use in training and management of the D2D link; and a second number of mainband lane pins, where the mainband lane pins are to implement a main data path of the D2D link, and the second number of mainband lane pins include forwarded clock, a valid lane pin, and a plurality of data lane pins, where the logical PHY coordinates functions of the sideband lane pins and the mainband lane pins.

Example 2 includes the subject matter of example 1, where the PHY circuitry further includes an interface to communicatively couple to die-to-die adapter circuitry, where the die-to-die adapter circuitry is to facilitate data transfer between a protocol layer and a physical layer implemented using the PHY circuitry.

Example 3 includes the subject matter of example 2, where the interface defines a collection of signals for communication between the PHY circuitry and the die-to-die adapter circuitry.

Example 4 includes the subject matter of any one of examples 2-3, where the die-to-die adapter is to implement reliable data transfer on the D2D link, perform arbitration and multiplexing between protocol layers, perform link state management for the D2D link, and perform protocol and parameter negotiation for the D2D link.

Example 5 includes the subject matter of any one of examples 2-4, where the protocol layer is to implement a particular protocol and generate data according to the particular protocol.

Example 6 includes the subject matter of example 5, where the data includes flit data having a particular format.

Example 7 includes the subject matter of example 5, where the particular protocol includes one of Peripheral Component Interconnect Express (PCIe) or Compute Express Link (CXL).

Example 8 includes the subject matter of example 5, where the particular data includes streaming data.

Example 9 includes the subject matter of any one of examples 1-8, where the first number of sideband lanes and the second number of mainband lanes are organized into a module, and a physical layer of the D2D link is implemented as an integer multiple of one or more of the modules.

Example 10 includes the subject matter of example 9, where the physical layer of the D2D link consists of a single module, and the single module is the first module.

Example 11 includes the subject matter of any one of examples 9-10, where the physical layer of the D2D link includes a plurality of instances of the module, and the logical PHY governs the plurality of instances of the module, where each module in the plurality of instances of the module includes a respective first number of sideband lanes and second number of mainband lanes.

Example 12 includes the subject matter of any one of examples 1-11, where the second number of mainband lanes further includes a set of extra lanes for use in lane repair in the main data path.

Example 13 includes the subject matter of any one of examples 1-12, where the sideband lanes operate in an always on domain.

Example 14 includes the subject matter of any one of examples 1-13, where the logical PHY is to: manage training and transfers on the sideband lanes; and manage training of the mainband lanes, where training of the sideband lanes is separate from the training of the mainband lanes.

Example 15 includes the subject matter of any one of examples 1-14, where a physical layer implemented at the port by the physical layer circuitry is to support data in either a flit mode or a raw mode.

Example 16 is a method including: receiving data at a physical layer block of a port, where the port includes the physical layer block, a protocol layer block, and a die-to-die adapter block between the PHY block and the protocol layer block, and the data is received from the die-to-die adapter via a defined interface connecting the PHY block and die-to-die adapter block, where the port couples a first die to a die-to-die (D2D) link, the D2D link couples the first die to a second die, and the D2D link includes a plurality of lanes; sending the data from the first die to the second die over the set of mainband lanes; and sending sideband data from the first die to the second die over a set of sideband lanes in the plurality of lanes.

Example 17 includes the subject matter of example 16, further including: generating particular data formatted according to an interconnect protocol implemented by the protocol layer block; sending the particular data to the die-to-die adapter via a defined interface connecting the protocol layer block to the die-to-die adapter; and mapping the particular data formatted according to an interconnect protocol implemented by the protocol layer block to a particular flit format to generate the data.

Example 18 includes the subject matter of example 17, where the particular data includes flit data.

Example 19 includes the subject matter of example 18, where the particular protocol includes one of Peripheral Component Interconnect Express (PCIe) or Compute Express Link (CXL).

Example 20 includes the subject matter of any one of examples 17-18, where the particular data includes streaming data.

Example 21 includes the subject matter of any one of examples 16-20, where the die-to-die adapter is to implement reliable data transfer on the D2D link, perform arbitration and multiplexing between protocol layers, perform link state management for the D2D link, and perform protocol and parameter negotiation for the D2D link.

Example 22 includes the subject matter of any one of examples 16-21, where the set of sideband lanes includes a first number of sideband lanes and the set of mainband lanes includes a second number of mainband lanes, the first number of sideband lanes and the second number of mainband lanes are organized into a module, and a physical layer of the D2D link is implemented as an integer multiple of one or more of the modules.

Example 23 includes the subject matter of example 22, where the physical layer of the D2D link consists of a single module, and the single module is the first module.

Example 24 includes the subject matter of any one of examples 22-23, where the physical layer of the D2D link includes a plurality of instances of the module, and the logical PHY governs the plurality of instances of the module, where each module in the plurality of instances of the module includes a respective first number of sideband lanes and second number of mainband lanes.

Example 25 includes the subject matter of any one of examples 22-24, where the second number of mainband lanes further includes a set of extra lanes for use in lane repair in the main data path.

Example 26 includes the subject matter of any one of examples 16-25, where the set of sideband lanes operate in an always on domain.

Example 27 is a system including means to perform the method of any one of examples 16-26.

Example 28 is a system including: a first die; and a second die coupled to the first die by a die-to-die (D2D) link, where the second die includes a port to connect the second die to the D2D link, and the port includes: protocol layer logic; die-to-die adapter circuitry; and physical layer circuitry, where the die-to-die adapter is positioned between the protocol layer logic and the physical layer circuitry and manages link states for the D2D link, and the physical layer circuitry includes: a first number of sideband lanes for the D2D link, where the sideband lanes are to carry data for use in training and management of the D2D link; and a second number of mainband lanes for the D2D link, where the mainband lanes are to implement a main data path of the D2D link, and the second number of mainband lanes include a forwarded clock lane, a valid lane, and a plurality of data lanes.

Example 29 includes the subject matter of example 28, where the PHY circuitry further includes an interface to communicatively couple to die-to-die adapter circuitry, where the die-to-die adapter circuitry is to facilitate data transfer between a protocol layer and a physical layer implemented using the PHY circuitry.

Example 30 includes the subject matter of example 29, where the interface defines a collection of signals for communication between the PHY circuitry and the die-to-die adapter circuitry.

Example 31 includes the subject matter of any one of examples 29-30, where the die-to-die adapter is to implement reliable data transfer on the D2D link, perform arbitration and multiplexing between protocol layers, perform link state management for the D2D link, and perform protocol and parameter negotiation for the D2D link.

Example 32 includes the subject matter of any one of examples 29-31, where the protocol layer is to implement a particular protocol and generate data according to the particular protocol.

Example 33 includes the subject matter of example 32, where the data includes flit data having a particular format.

Example 34 includes the subject matter of any one of examples 32-33, where the particular protocol includes one of Peripheral Component Interconnect Express (PCIe) or Compute Express Link (CXL).

Example 35 includes the subject matter of any one of examples 32-33, where the particular data includes streaming data.

Example 36 includes the subject matter of any one of examples 28-35, where the first number of sideband lanes and the second number of mainband lanes are organized into a module, and a physical layer of the D2D link is implemented as an integer multiple of one or more of the modules.

Example 37 includes the subject matter of example 36, where the physical layer of the D2D link consists of a single module, and the single module is the first module.

Example 38 includes the subject matter of any one of examples 36-37, where the physical layer of the D2D link includes a plurality of instances of the module, and the logical PHY governs the plurality of instances of the module, where each module in the plurality of instances of the module includes a respective first number of sideband lanes and second number of mainband lanes.

Example 39 includes the subject matter of any one of examples 28-38, where the second number of mainband lanes further includes a set of extra lanes for use in lane repair in the main data path.

Example 40 includes the subject matter of any one of examples 28-39, where the sideband lanes operate in an always on domain.

Example 41 includes the subject matter of any one of examples 28-40, where the logical PHY is to: manage training and transfers on the sideband lanes; and manage training of the mainband lanes, where training of the sideband lanes is separate from the training of the mainband lanes.

Example 42 includes the subject matter of any one of examples 28-41, where a physical layer implemented at the port by the physical layer circuitry is to support data in either a flit mode or a raw mode.

Example 43 includes the subject matter of any one of examples 28-42, where the first die includes a processor device, and the second die includes one of another processor device, a hardware accelerator, or an input/output (I/O) device.

Example 44 includes the subject matter of any one of examples 28-42, where the first die and the second die are on a same package.

Example 45 includes the subject matter of any one of examples 28-42, where the first die includes a first retimer, the second die includes a second retimer, the first die and the second die are on separate packages, and the D2D link implements an off-package interconnect.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a port to couple to another die over a die-to-die (D2D) link, wherein the port comprises:
      physical layer (PHY) circuitry comprising:
         a logical PHY;
         a first number of sideband lane pins, wherein the sideband lane pins are to carry data for use in training and management of the D2D link; and
         a second number of mainband lane pins, wherein the mainband lane pins are to implement a main data path of the D2D link, and the second number of mainband lane pins comprise forwarded clock, a valid lane pin, and a plurality of data lane pins,
      wherein the logical PHY coordinates functions of the sideband lane pins and the mainband lane pins.

2. The apparatus of claim 1, wherein the PHY circuitry further comprises an interface to communicatively couple to die-to-die adapter circuitry, wherein the die-to-die adapter circuitry is to facilitate data transfer between a protocol layer and a physical layer implemented using the PHY circuitry.

3. The apparatus of claim 2, wherein the interface defines a collection of signals for communication between the PHY circuitry and the die-to-die adapter circuitry.

4. The apparatus of claim 2, wherein the die-to-die adapter is to implement reliable data transfer on the D2D link, perform arbitration and multiplexing between protocol layers, perform link state management for the D2D link, and perform protocol and parameter negotiation for the D2D link.

5. The apparatus of claim 1, wherein the first number of sideband lanes and the second number of mainband lanes are organized into a module, and a physical layer of the D2D link is implemented as an integer multiple of one or more of the modules.

6. The apparatus of claim 5, wherein the physical layer of the D2D link consists of a single module, and the single module is the first module.

7. The apparatus of claim 5, wherein the physical layer of the D2D link comprises a plurality of instances of the module, and the logical PHY governs the plurality of instances of the module, wherein each module in the plurality of instances of the module comprises a respective first number of sideband lanes and second number of mainband lanes.

8. The apparatus of claim 1, wherein the second number of mainband lanes further comprises a set of extra lanes for use in lane repair in the main data path.

9. The apparatus of claim 1, wherein the sideband lanes operate in an always on domain.

10. The apparatus of claim 1, wherein the logical PHY is to:
    manage training and transfers on the sideband lanes; and
    manage training of the mainband lanes, wherein training of the sideband lanes is separate from the training of the mainband lanes.

11. The apparatus of claim 1, wherein a physical layer implemented at the port by the physical layer circuitry is to support data in either a flit mode or a raw mode.

12. A method comprising:
    receiving data at a physical layer block of a port, wherein the port comprises the physical layer block, a protocol layer block, and a die-to-die adapter block between the PHY block and the protocol layer block, and the data is received from the die-to-die adapter via a defined interface connecting the PHY block and die-to-die adapter block, wherein the port couples a first die to a die-to-die (D2D) link, the D2D link couples the first die to a second die, and the D2D link comprises a plurality of lanes;

sending the data from the first die to the second die over the set of mainband lanes; and sending sideband data from the first die to the second die over a set of sideband lanes in the plurality of lanes.

13. The method of claim 12, further comprising:

generating particular data formatted according to an interconnect protocol implemented by the protocol layer block;

sending the particular data to the die-to-die adapter via a defined interface connecting the protocol layer block to the die-to-die adapter; and mapping the particular data formatted according to an interconnect protocol implemented by the protocol layer block to a particular flit format to generate the data.

14. The method of claim 13, wherein the particular data comprises flit data.

15. The method of claim 14, wherein the particular protocol comprises one of Peripheral Component Interconnect Express (PCIe) or Compute Express Link (CXL).

16. The method of claim 13, wherein the particular data comprises streaming data.

17. A system comprising:

a first die; and a second die coupled to the first die by a die-to-die (D2D) link, wherein the second die comprises a port to connect the second die to the D2D link, and the port comprises:

protocol layer logic;

die-to-die adapter circuitry; and physical layer circuitry, wherein the die-to-die adapter is positioned between the protocol layer logic and the physical layer circuitry and manages link states for the D2D link, and the physical layer circuitry comprises:

a first number of sideband lanes for the D2D link, wherein the sideband lanes are to carry data for use in training and management of the D2D link; and a second number of mainband lanes for the D2D link, wherein the mainband lanes are to implement a main data path of the D2D link, and the second number of mainband lanes comprise a forwarded clock lane, a valid lane, and a plurality of data lanes.

18. The system of claim 17, wherein the first die comprises a processor device, and the second die comprises one of another processor device, a hardware accelerator, or an input/output (I/O) device.

19. The system of claim 17, wherein the first die and the second die are on a same package.

20. The system of claim 17, wherein the first die comprises a first retimer, the second die comprises a second retimer, the first die and the second die are on separate packages, and the D2D link implements an off-package interconnect.

* * * * *